(12) United States Patent
Robinson et al.

(10) Patent No.: US 9,294,755 B2
(45) Date of Patent: Mar. 22, 2016

(54) CORRECTING FRAME-TO-FRAME IMAGE CHANGES DUE TO MOTION FOR THREE DIMENSIONAL (3-D) PERSISTENT OBSERVATIONS

(75) Inventors: Ian S. Robinson, Redondo Beach, CA (US); John D. Bloomer, Redondo Beach, CA (US); Michael D. Vahey, Manhattan Beach, CA (US)

(73) Assignee: RAYTHEON COMPANY, Waltham, MA (US)

(*) Notice: Subject to any disclaimer, the term of this patent is extended or adjusted under 35 U.S.C. 154(b) by 461 days.

(21) Appl. No.: 12/908,540

(22) Filed: Oct. 20, 2010

(65) Prior Publication Data

US 2012/0098933 A1 Apr. 26, 2012

(51) Int. Cl.
*H04N 5/228* (2006.01)
*H04N 13/02* (2006.01)
(Continued)

(52) U.S. Cl.
CPC .......... *H04N 13/0221* (2013.01); *G06T 7/0071* (2013.01); *H04N 13/0018* (2013.01); *G06T 2207/10032* (2013.01); *G06T 2207/30232* (2013.01); *H04N 5/23267* (2013.01)

(58) Field of Classification Search
CPC .......... H04N 13/0018; H04N 13/0221; H04N 5/23267; H04N 5/228; H04N 13/02
USPC ............... 248/46, 218.1; 382/103, 104, 284
IPC ............................................. H04N 5/228, 13/02
See application file for complete search history.

(56) References Cited

U.S. PATENT DOCUMENTS 5,109,435 A  4/1992 Lo et al.
5,991,444 A  11/1999 Burt et al.
(Continued)

FOREIGN PATENT DOCUMENTS

DE  196 15 657 A1  8/1997
JP  06078272  3/1994
(Continued)

OTHER PUBLICATIONS

Wiegand et al.; "Overview of the H.264/AVC Video Coding Standard"; IEEE Transactions on Circuits and Systems for Video Technology; Jul. 1, 2003; pp. 560-576; 13(7); IEEE Service Center; Piscataway, NJ, US.
(Continued)

*Primary Examiner* — Allen Parker
*Assistant Examiner* — Long Le
(74) *Attorney, Agent, or Firm* — Burns & Levinson LLP; Joseph M. Maraia

(57) ABSTRACT

An imaging platform minimizes inter-frame image changes when there is relative motion of the imaging platform with respect to the scene being imaged, where the imaging platform may be particularly susceptible to image change, especially when it is configured with a wide field of view or high angular rate of movement. In one embodiment, a system is configured to capture images and comprises: a movable imaging platform having a sensor that is configured to capture images of a scene, each image comprising a plurality of pixels; and an image processor configured to: digitally transform captured images with respect to a common field of view (FOV) such that the transformed images appear to be taken by a non-moving imaging platform, wherein the pixel size and orientation of pixels of each transformed image are the same. A method for measuring and displaying 3-D features is also described.

28 Claims, 29 Drawing Sheets

(51) Int. Cl.
*H04N 13/00* (2006.01)
*G06T 7/00* (2006.01)
*H04N 5/232* (2006.01)

(56) References Cited

U.S. PATENT DOCUMENTS

| | | | |
|---|---|---|---|
| 6,738,424 | B1 | 5/2004 | Allmen et al. |
| 7,085,401 | B2 | 8/2006 | Averbuch et al. |
| 7,366,325 | B2 * | 4/2008 | Fujimura et al. ............... 382/104 |
| 7,440,637 | B2 * | 10/2008 | Schechner et al. ............ 382/284 |
| 7,650,058 | B1 | 1/2010 | Garoutte |
| 7,792,520 | B2 | 9/2010 | Sohn et al. |
| 7,990,422 | B2 * | 8/2011 | Ahiska et al. ............... 348/218.1 |
| 8,004,570 | B2 | 8/2011 | Saito et al. |
| 8,325,799 | B2 | 12/2012 | Chono et al. |
| 8,400,619 | B1 | 3/2013 | Bachrach et al. |
| 2003/0122862 | A1 | 7/2003 | Takaku et al. |
| 2003/0122868 | A1 | 7/2003 | Aggarwal et al. |
| 2003/0215141 | A1 * | 11/2003 | Zakrzewski et al. .......... 382/190 |
| 2004/0197014 | A1 | 10/2004 | Oohashi |
| 2005/0158023 | A1 | 7/2005 | Takasu et al. |
| 2005/0162701 | A1 | 7/2005 | Hirano |
| 2006/0045311 | A1 | 3/2006 | Shibuya |
| 2007/0071296 | A1 | 3/2007 | Nonaka et al. |
| 2007/0132856 | A1 | 6/2007 | Saito et al. |
| 2007/0253625 | A1 | 11/2007 | Yi |
| 2008/0063355 | A1 | 3/2008 | Nakano |
| 2008/0273751 | A1 | 11/2008 | Yuan et al. |
| 2009/0136023 | A1 | 5/2009 | Pan et al. |
| 2010/0014709 | A1 * | 1/2010 | Wheeler et al. ............... 382/103 |
| 2010/0073519 | A1 | 3/2010 | Onoe et al. |
| 2010/0097444 | A1 * | 4/2010 | Lablans ........................ 348/46 |
| 2010/0100835 | A1 | 4/2010 | Klaric et al. |
| 2010/0265364 | A1 | 10/2010 | Robinson et al. |
| 2012/0019660 | A1 * | 1/2012 | Golan et al. ................... 348/144 |
| 2012/0098933 | A1 | 4/2012 | Robinson et al. |
| 2012/0177121 | A1 | 7/2012 | Tripathi et al. |
| 2012/0320237 | A1 | 12/2012 | Liu et al. |

FOREIGN PATENT DOCUMENTS

| | | |
|---|---|---|
| JP | 09200704 | 7/1997 |
| WO | 03058960 | 7/2003 |
| WO | 2008/072024 A1 | 6/2008 |
| WO | 2010032058 A1 | 3/2010 |

OTHER PUBLICATIONS

Creech; "NGA Approaches to Wide Area Motion Imagery"; National Geospatial-Intelligence Agency; pp. 1-21; [Approved for Public Release 11-146][AIE Eastern FMV Conference][Feb. 28, 2011-Mar. 2, 2011].

Heller; "From Video to Knowledge"; Lawrence Livermore National Laboratory; pp. 4-11 (2011).

Singh; "Performance Analysis for Objective Methods of Video Quality Assessment"; 9 pages; [Printed online: Oct. 24, 2010 at http://www.eetimes.com/General/DisplayPrintViewContent?contentItemId=4196911; Published Oct. 18, 2005].

Sullivan et al.; "The H.264/AVC Advanced Video Coding Standard: Overview and Introduction to the Fidelity Range Extensions"; SPIE Conference on Applications of Digital Image Processing XXVII; pp. 1-22 (2004).

Nadernejad, E., "Edge Detection Technique: Evaluation and Comparisons" Applied Mathematical Sciences, vol. 2, No. 31, pp. 1507-1520 (2008).

Seitz, S. M. et al., "A Comparison and Evaluation of Multi-View Stereo Reconstr. Algorithms," Proceedings of the 2006 IEEE Computer Soc'y Conf. on Computer Vision and Pattern Recognition, vol. 1, 8 pages (2006).

Anandan et al., "Video as an image data source: efficient representations and applications," Proceedings of the International Conference on Image Processing (ICIP). Washington, Oct. 23-26, 1995; IEEE Comp.Soc. Press, US vol. D 1, pp. 318-321.

Comanducci et al., "2D-to-3D Photo Rendering for 3D Displays", Proc. 5th Int. Symposium on 3D Data Processing, Visualization and Transmission, Paris, May 1, 2010, XP055198218.

* cited by examiner

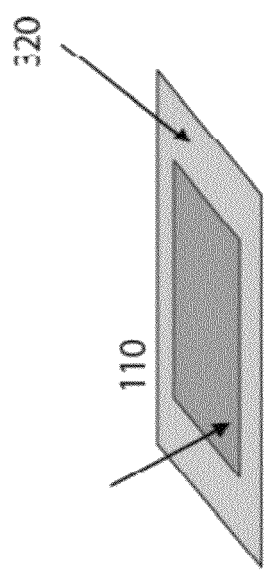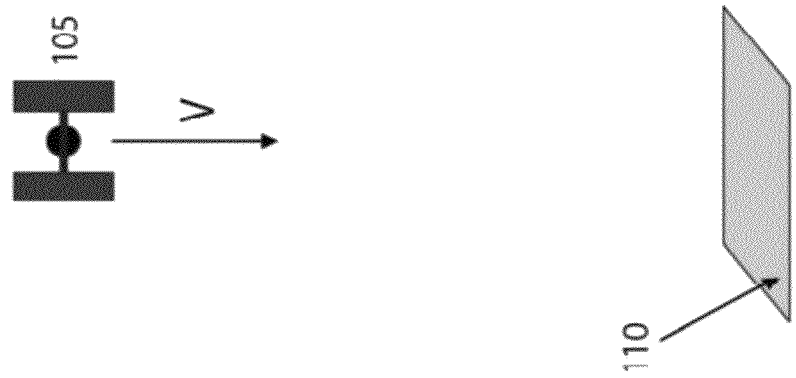

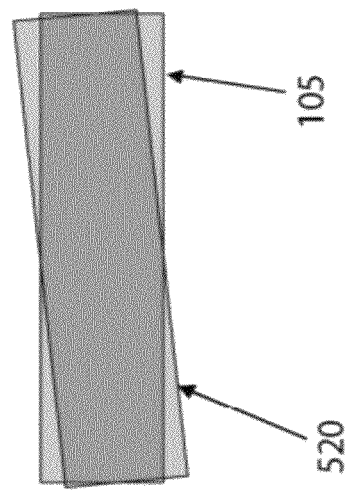
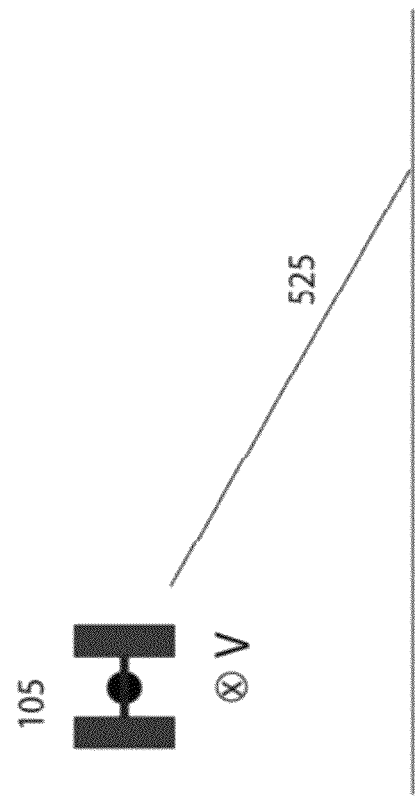
FIG. 5B
FIG. 5A

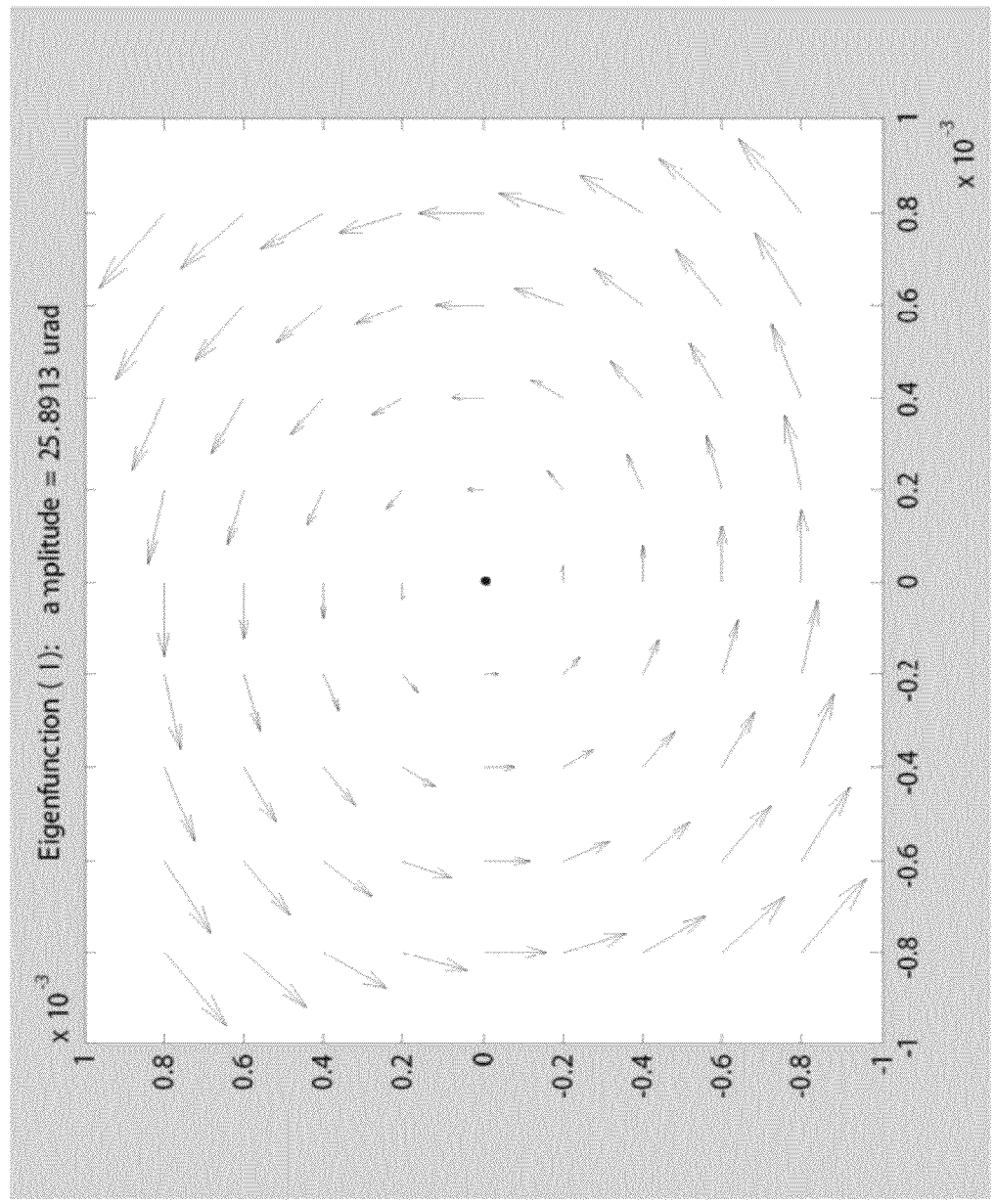

CORRECTING FRAME-TO-FRAME IMAGE CHANGES DUE TO MOTION FOR THREE DIMENSIONAL (3-D) PERSISTENT OBSERVATIONS

BACKGROUND

This application generally relates to image processing, and more particularly, correcting frame-to-frame image changes due to motion for three dimensional (3-D) persistent observations.

There is a desire to collect persistent video (i.e., multiple image sequences) of a target from overhead platform-based (e.g., airborne or space-based) sensors that can easily be viewed, and/or interpreted, via displays. This may be especially important for military personnel and/or for other persons, using portable devices that may have limited processing capabilities. Conventional persistent video sensors generally stay fixed to (or focus on) a single point, for instance, on the ground, while the overhead platform is in motion. The motion of the platform, however, causes changes in scale, perspective (e.g. parallax), rotation, and/or other changes in viewing geometry. These changes can complicate or prevent human and/or machine interpretation of targets, features, and threats.

Conventional persistent video relies on human interpretation to ignore changes in the measured scene that result from platform motion.

Stereo photogrammetric systems generally collect two disparate views of a scene and heavily process them to create 3-D maps. For instance, overhead scanning sensors may collect multiple images that are processed to estimate 3-D features in the images. Error in conventional height estimates are large, though, typically a multiple of the ground sample distance ("GSD") of the sensor. U.S. patent application Ser. No. 12/425,188, filed Apr. 16, 2009, and herein incorporated by reference in its entirety, discloses a self-correcting adaptive long-stare electro-optical system ("SCALES") that is configured to calculate transformations to prevent image intra-frame distortion caused by a relative motion between the scene and the imaging platform and to prevent geometric differences from manifesting as smear within an integration time, thus preventing intra-frame distortion. However, this system relies upon controlling an optical element based on the transformation to prevent the image distortion, and may require more computations for intra-frame motion prevention.

An imaging platform having improved image quality thus is desired without the aforementioned drawbacks. For example, an imaging platform is desired which can correct frame-to-frame image changes caused by relative motion between the imaging platform and the scene. Further, an imaging platform is desired which can enhance the quality of captured images in applications which are particularly susceptible to inter-frame changes, e.g., imaging platforms having a wide field of view and/or high angular rates of movement with respect to the ground, especially for three-dimensional features in the scene.

SUMMARY

According to various embodiments, an imaging platform can minimize inter-frame image change when there is relative motion of the imaging platform with respect to the scene. In particular, airborne and low-orbit space imaging platforms used for ground imaging, for example, tend to be sensitive to motion due to their wide fields of view and/or high angular rates of movement.

In an embodiment, a system is configured to capture images and comprises: a movable imaging platform having a sensor that is configured to capture images of a scene, each image comprising a plurality of pixels; and an image processor configured to: digitally transform captured images with respect to a common field of view (FOV) such that the transformed images appear to be taken by a non-moving imaging platform, wherein the pixel size and orientation of pixels of each transformed image are the same.

In another embodiment, a method for capturing images comprises: capturing images of a scene with a sensor on a moving imaging platform, each image comprising a plurality of pixels; and digitally transforming captured images with respect to a common field of view (FOV) such that the transformed images appear to be taken by a non-moving imaging platform, wherein the pixel size and orientation of pixels of each transformed image are the same.

In various embodiments, systems and methods for measuring and displaying 3-D features are also described. And, in various embodiments, user feedback may provide improved results.

These and other features and advantages of the system and method will be apparent from this disclosure. It is to be understood that the summary, drawings, and detailed description are not restrictive of the scope of the inventive concept described herein.

BRIEF DESCRIPTION OF THE DRAWINGS

FIG. 3A shows an imaging platform and its initial field of view;

FIG. 3B shows a change in scale of a subsequent field of view of the imaging platform due to movement of the imaging platform toward the area being imaged;

FIG. 5A shows an imaging platform as it approaches the reader in a direction perpendicular to the plane of the page;

FIG. 5B shows a subsequent field of view due to skew;

FIG. 6A shows a vector field of an exemplary transformation comprising a rotation;

DETAILED DESCRIPTION

Figure 1B:
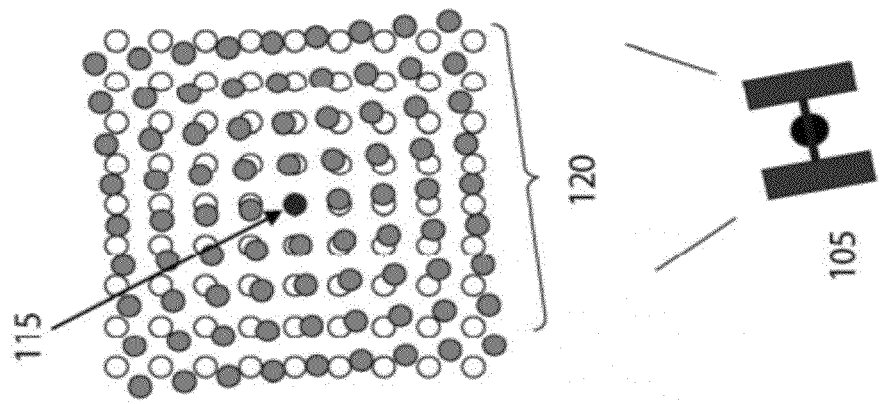
FIG. 1B shows changes between the initial field of view and a subsequent field of view.

According to one or more embodiments, a system (and method) enable image frames to be captured by a moving platform-based sensor and to be displayed and/or processed, as if the platform motion never occurred. In addition, the system and method can correct three dimensional (3-D) persistent observations which introduce apparent movement in image frames. This greatly facilitates and simplifies both human and machine target recognition when displayed.

A system configured to capture images may include a movable imaging platform having a sensor that is configured to capture images of a scene, each image comprising a plurality of pixels; and an image processor configured to: digitally transform captured images with respect to a common field of view (FOV) such that the transformed images appear to be taken by a non-moving imaging platform. The pixel size and orientation of the pixels of each transformed image are the same in the common FOV.

In some implementations, the image processor may be further configured to: identify and monitor one or more three-dimensional (3-D) features of a target in the scene which, after frame-to-frame transformation, move along a deterministic and predictable path as a function of the imaging platform's motion and location of a target with respect to the imaging platform. Further, the image processor may as well determine, from the transformed images, a height, an elevation, or 3-D information associated with tracked features associated with the determined feature of the tracked target.

The images may include, for example, video images and/or multiple intermittent still images, collected by a sensor. In one or more implementation, the sensor may be a camera. The frame rate for video may be, for example, 30 frames per second (fps) or Hz. Although, frame rates can also be higher, such as, for example, 60 fps. Image frames may be digitally data and include a plurality of pixels, whether supporting various colors (e.g., red-green-blue (RGB) or cyan-yellow-magenta-black (CYMK)) or monochrome, and that are of sufficient resolution to permit a viewer to appreciate what is depicted therein. For example, the resolution may be 480 pixels in both width and height, or greater, such as 640×480, 800×800, 1024×768 or 1280×800, for example. Other resolutions (e.g., smaller and larger) are also possible.

According to an embodiment, frame-to-frame changes for persistent video frames are determined, for example, based on a function of platform trajectory and sensor pointing angles with respect to a fixed field of view (FOV).

Inter-frame changes for a persistent video collection can be determined or computed for image frame sets (i.e., sequences of images) as well as super-frame sets (i.e., multiple frame sets). As used herein, "inter-frame" refers to aspects between image frames, also referred to as "frame-to-frame."

On the other hand, "intra-frame," as used herein, refers to aspects within a single image frame. For instance, intra-frame distortion in an (single) image typically manifests as a loss of edge contrast (e.g., smear or blurriness) or in such a way that objects do not have the correct proportionality or orientation relative to other objects in the image. U.S. patent application Ser. No. 12/425,188, mentioned above, describes preventing intra-frame distortion.

According to one or more embodiments, each image collected is correct as viewed from the platform at that moment. The image frames may be collected by the sensor at different times or instances. In some instances, these frames may be adjacent or successive image frames, such as in the case for typical video. In others, the frames may be processed at different times but not necessarily in the order collected by the sensor.

Many short exposure images (e.g., 1 to 100 ms) of the scene may be taken by the sensor. The exposures are selected to be sufficiently short that the platform motion within one exposure period (or image) is expected to be relatively small. Successive frames are then manipulated or transformed to have the appearance of being viewed by a stationary viewer.

It will be appreciated that the sensor need not be trained on any particular location in the scene. Rather, the transformations may provide a scene that appears to be taken from a non-moving platform (with exception of actual moving objects and objects with height above the ground plane). Moving objects may be more readily detected by an observer since the background is approximately stationary. 3-D features having a height exhibit a slight "leaning" motion through the scene along predictable paths. The rate of movement is directly proportional to the height of the object.

In some implementations, a step-wise inter-frame transformation process may be applied to collected images, for instance, within the sensor such that each frame "appears" to be collected from the same fixed or non-moving" vantage point (although in actuality the platform is moving), with the exception that objects with a height (or depth) with respect to the ground (or other horizontal reference plane) will appear to shift very slowly in a predictable fashion corresponding to a user's perspective and/or vantage point Electronic Instructions digitally transform successive frames or frame sets to each other may be generated and supplied with the imagery enabling constant images and video sequences to be displayed. This may be beneficial for instance, for small, portable digital devices.

According to an embodiment, the system may be configured to provide both two-dimensional (2-D) and three-dimensional (3-D) displays of static imagery or motion pictures. In one implementation, moving and stationary objects in image frames may be processed so as to remove or ameliorate inter-frame image changes due to motion. However, in some instances, target objects having a relative height or depth with respect to the ground will appear to "lean" in a determinable or predictable fashion, to give the viewer the perspective of height, in both 2-D and 3-D modes. The predictable motion of the "leaners" is used to simply and refine height estimation.

Video sequences of the transformed imagery may be displayed, in which static, moving, and/or 3-D objects may be identified (e.g., highlighted, color-coded, annotated, etc.) in the displayed image(s) of the scene. As such, human and machine interpretation is greatly facilitated. No additional digital image processing may be required once the images are transformed, in many instances.

In case that the persistent video sensor is not making correct predictions of inter-frame geometric change, user input may be used to make adjustments.

The determined inter-frame changes may then be modeled to one or more transformations. In one or more embodiments, the transformations can be applied to successive frames based on the eigenfunctions to efficiently remove inter-frame changes in images due to platform motion, such that each frame appears to be collected from the fixed or non-moving vantage point. In some implementations, the system may use one or more of the same a priori eigenfunctions described in U.S. patent application Ser. No. 12/425,188, mentioned above. These eigenfunctions may be used to digitally transform multiple image frames so that they appear as if they are being viewed from non-moving platform. This improves 2-D display of images by removing apparent motion of all pixels. The non-moving objects in the frames appear nearly stationary.

The system (and method) also provide enhanced resolution (e.g., super-resolution) imagery which can also be selected for display. Enhanced 2-D displays of the imagery may be further provided, for example, by applying a super-resolution technique to aggregates of transformed scenes. Moreover, 3-D displays of the imagery may be provided via stereo displays. This may require little, if any, additional processing. Video sequences of the image frames may be displayed, in which static, moving, and 3-D objects may be identified (e.g., highlighted) in the scene. As such, human and machine interpretation is greatly facilitated. No additional digital image processing may be required in may instances.

The system provides automated height measurements and may provide improved height errors compared to conventional systems. Moreover, the system can provide numerical, color-coded, and/or other displays of object height rendered in the image. Height of objects may be estimated by tracking object features along the predicted "lean" direction and reported (e.g., displaying by annotation or color). In one estimation technique, the degree of lean is assumed to be proportional to the height of the objected feature.

In situations where the system may not be making correct predictions of inter-frame geometric changes, user feedback may be used to optimize and/or otherwise correct the system to further reduce errors. For example, a display based menu may enable users to identify the type and scale of mismatched objects for providing feedback for improved subsequent image collection and geolocation. Geolocation, for instance, is the identification of real-word geographic location of an object. Various geolocation data providers exist which may be used.

In addition, users may be presented with one or more pictorial templates to identify system pointing errors and to provide correction using drag and drop tools, and well as one or more planning menu to extract 3-D height fidelity, schedules constraints on revisits, number of frames, pointing angles.

FIGS. 1-5 illustrate image change problems due to a moving imaging platform-based sensor. As mentioned above, persistent image and video sensors generally stay fixed to (or stare at, or focus on) a single point being tracked, for instance, on the ground, while the overhead imaging platform is in motion. However, motion of the platform, can causes changes in scale, perspective (e.g. parallax), rotation, and/or other changes in viewing geometry. These changes can complicate or prevent human and/or machine interpretation of targets, features, and threats.

Figure 1A:
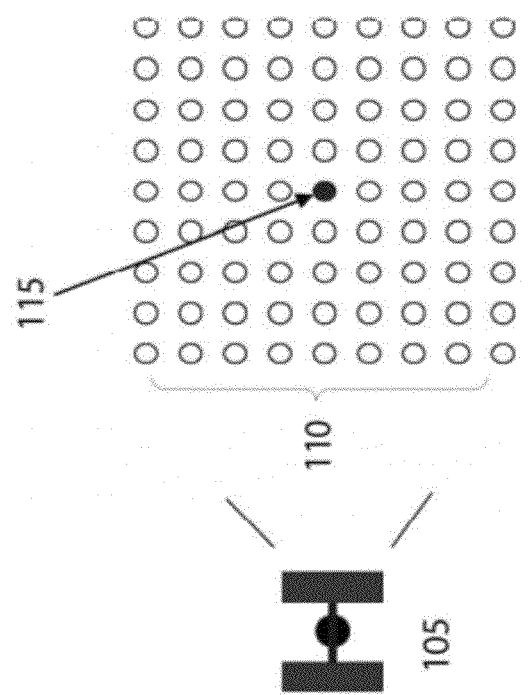
FIG. 1A shows an imaging platform and its initial field of view.

FIG. 1A shows imaging platform 105 (in this case, a satellite), having initial field of view 110, capturing images while gazing at staring point 115. An initial image is sensed at initial detector points (e.g., pixels) (shown as open circles). However, in a subsequent image, the field of view of imaging platform 105 may change due to relative movement between the scene and imaging platform 105.

FIG. 1B shows that due to the motion of imaging platform 105 a subsequent field of view 120 is no longer coextensive with initial field of view 110 in a later image capture. For instance, while it is possible to align (center) staring point 115, the detector points (shown as darkened circles) are shifted with respect to the initial detector points. As a result, an image, or a composite image formed by combining images may be blurred.

Figure 2B:
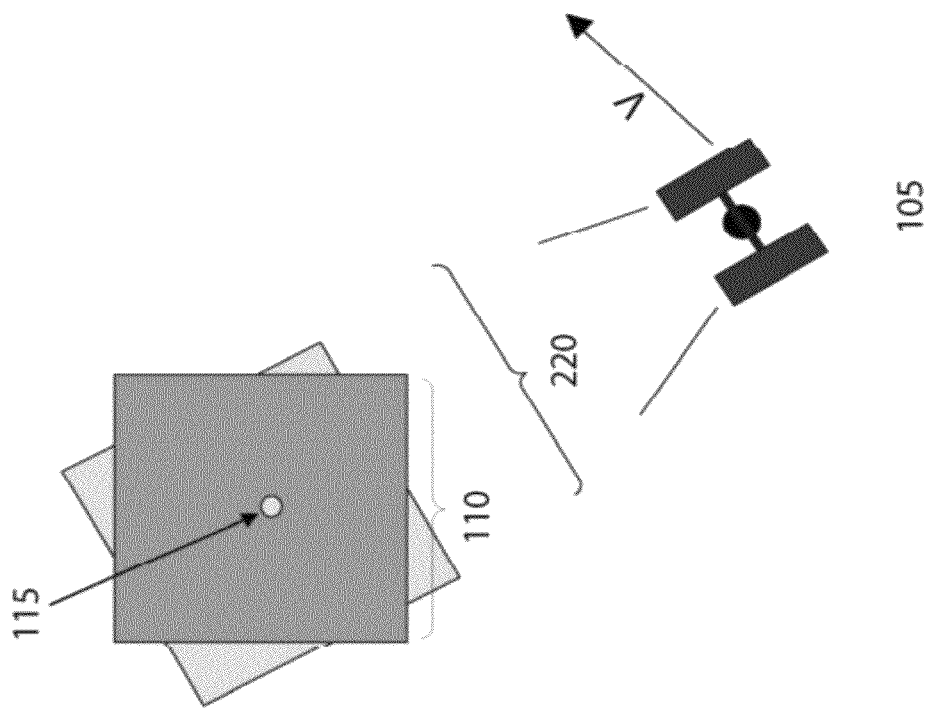
FIG. 2B shows a subsequent field of view due to the movement of the imaging platform between the initial and subsequent imaging time.
Figure 2A:
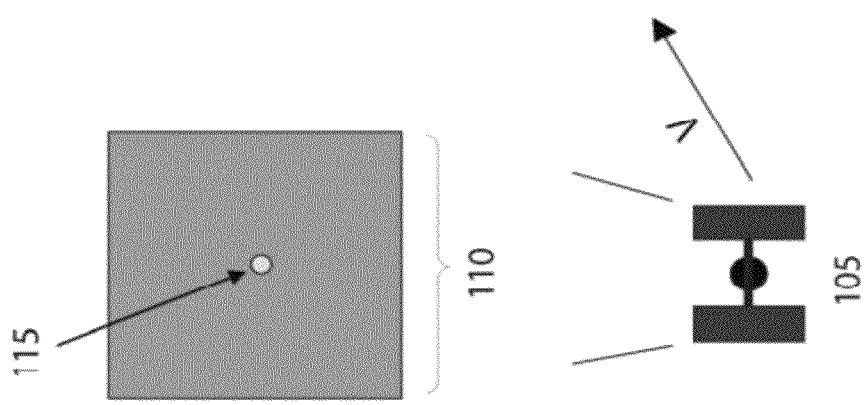
FIG. 2A shows an imaging platform and its initial field of view about a staring point.

FIGS. 2A-5C show examples of physical motions which may cause image change. FIG. 2A, for example, shows initial field of view 110 as imaging platform 105 stares at point 115 while the platform moves at velocity V. FIG. 2B shows a change of subsequent field of view 220 due to the overall motion.

The changes in the size and orientation of the field of view are decomposed into a series of eigenmodes. FIG. 3A shows initial field of view 110 as the altitude of imaging platform 105 is reduced. FIG. 3B shows a scale changes of subsequent field of view 320. In this example, the change in scale is equal in both the horizontal and vertical directions since imaging platform 105 moves directly toward field of view 110. However, in general, the change in scale may be different along each axis. Changes in scale of the field of view also result in changes in the mapping of individual image pixels to the scene.

Figure 4B:
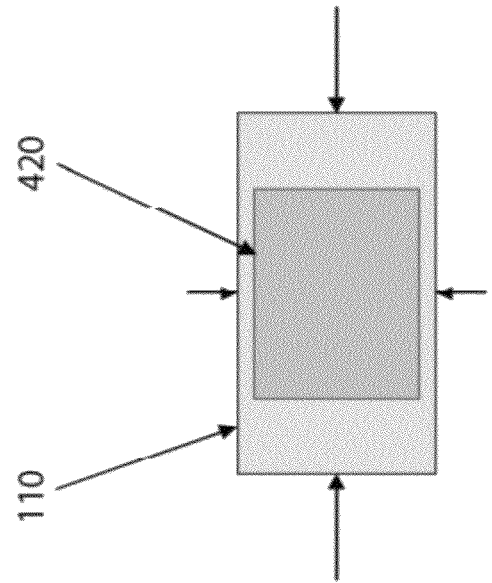
FIG. 4B shows a subsequent field of view scaled in both the X and Y-directions due to the reduction in altitude and zenith angle.
Figure 4A:
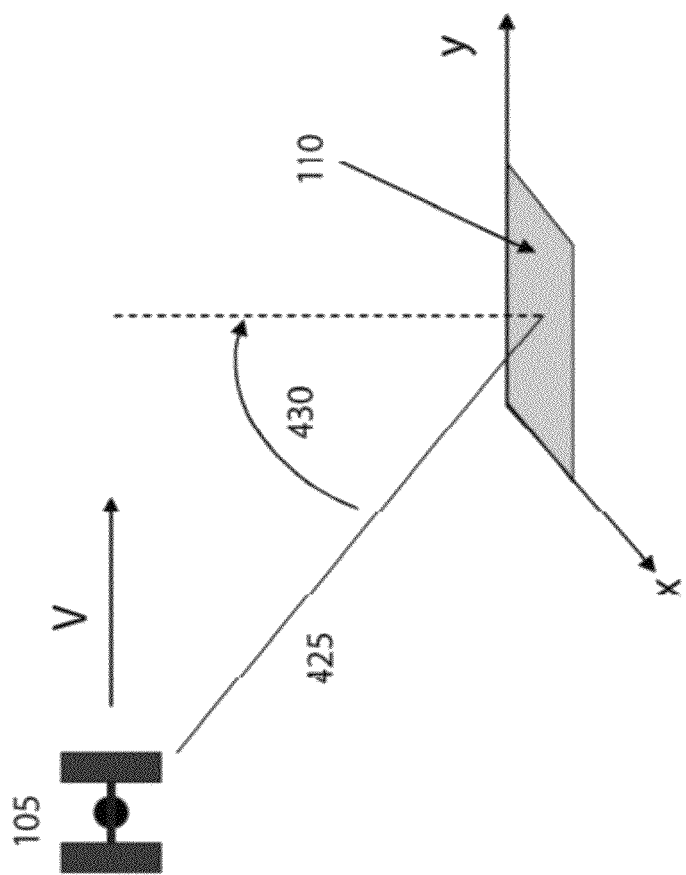
FIG. 4A shows an imaging platform as both its altitude and angle from the zenith is reduced.

FIG. 4A shows imaging platform 105 approaching both the zenith and the area being imaged. FIG. 4B shows an anamorphic scale change of subsequent field of view 420. In particular, subsequent field of view 420 is scaled in both the X and Y directions due to the reduction in altitude of imaging platform 105. Further, subsequent field of view 420 is scaled in the Y-direction more than in the X-direction because line-ofsight 425 remains perpendicular to the X-axis while angle 430 changes with respect to the Y-axis due to the change in zenith angle.

Figure 5C:
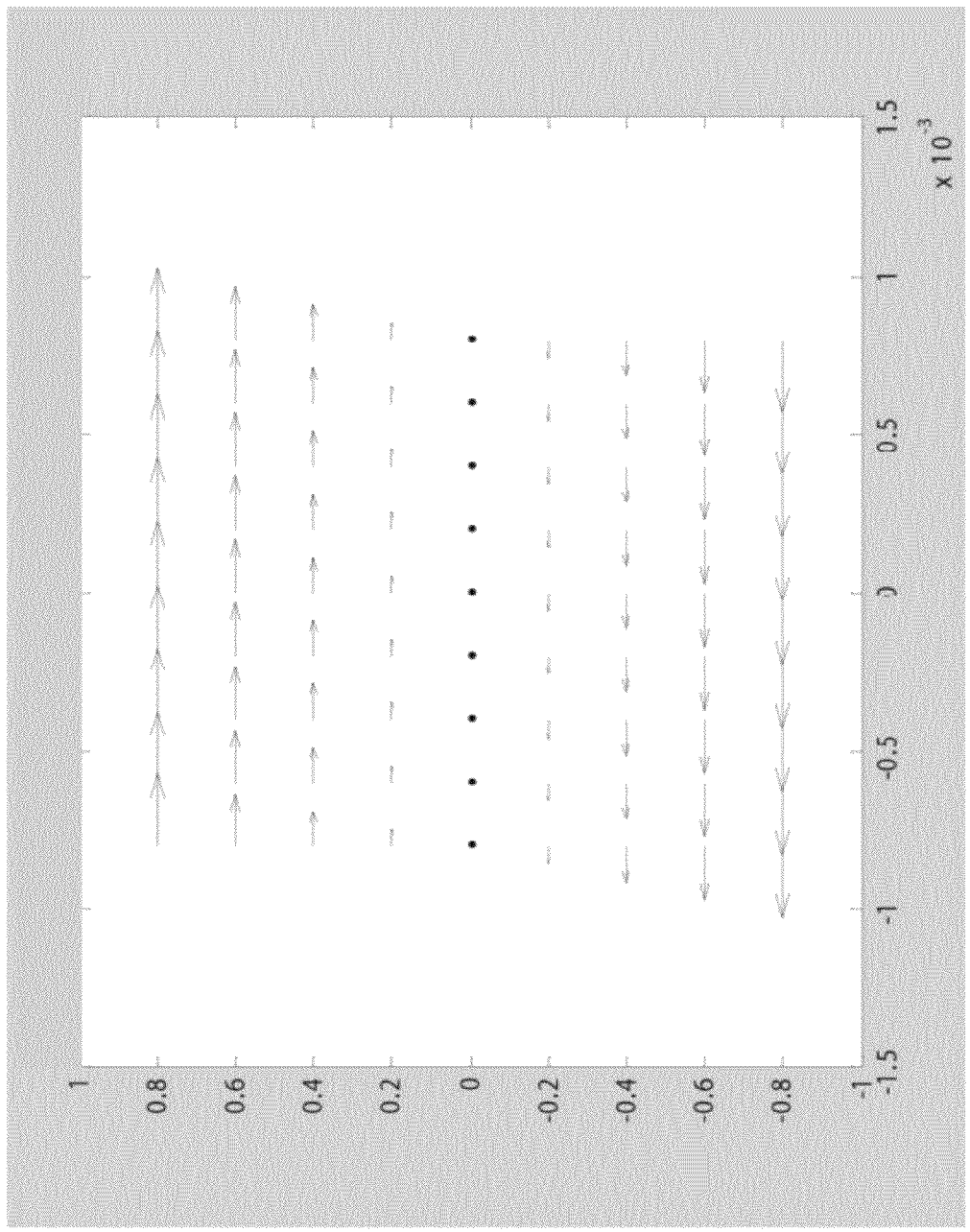
FIG. 5C shows skew depicted as a vector field.
Figure 6B:
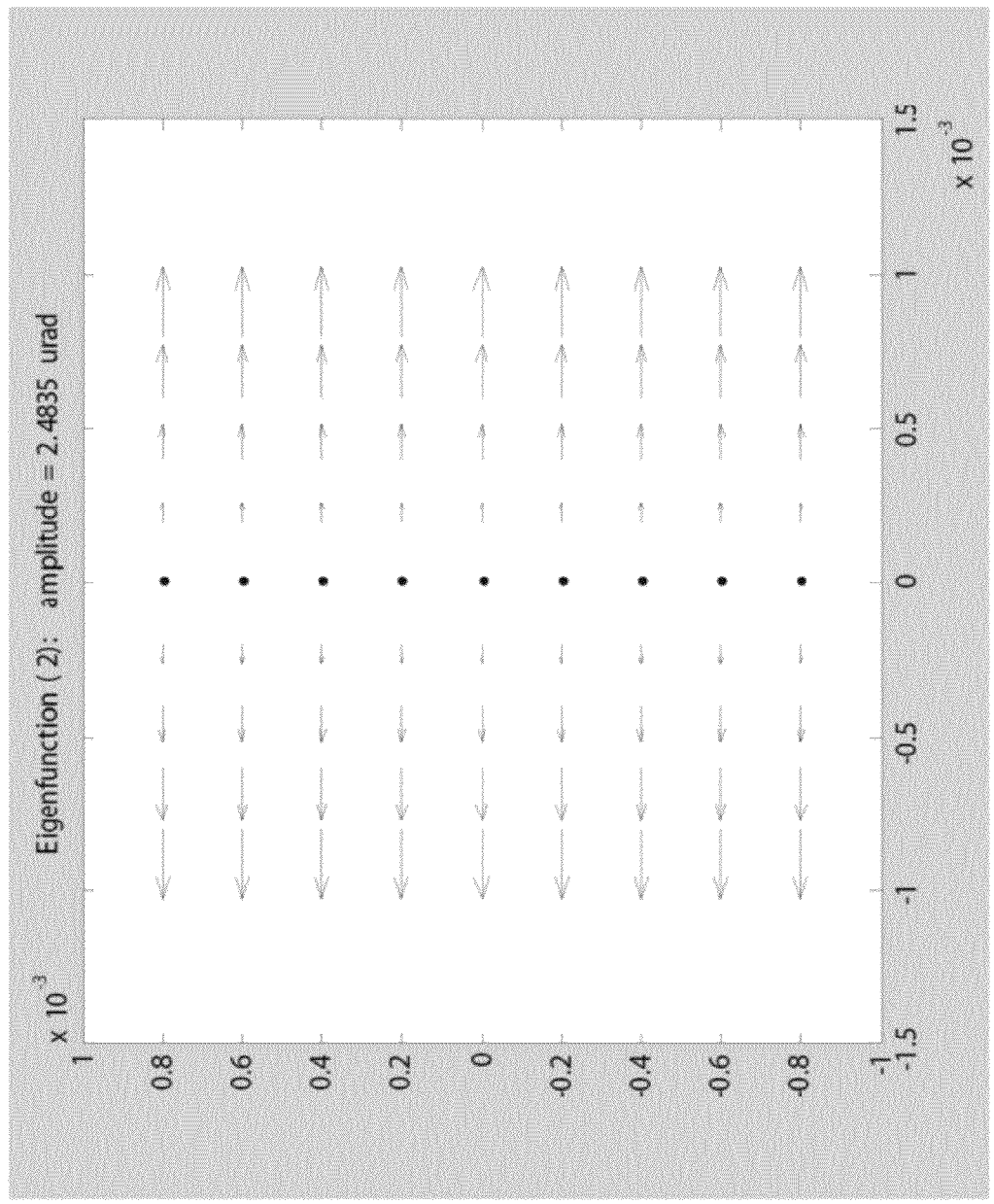
FIG. 6B shows a vector field of an exemplary transformation comprising a anamorphic stretch in the X direction.
Figure 6C:
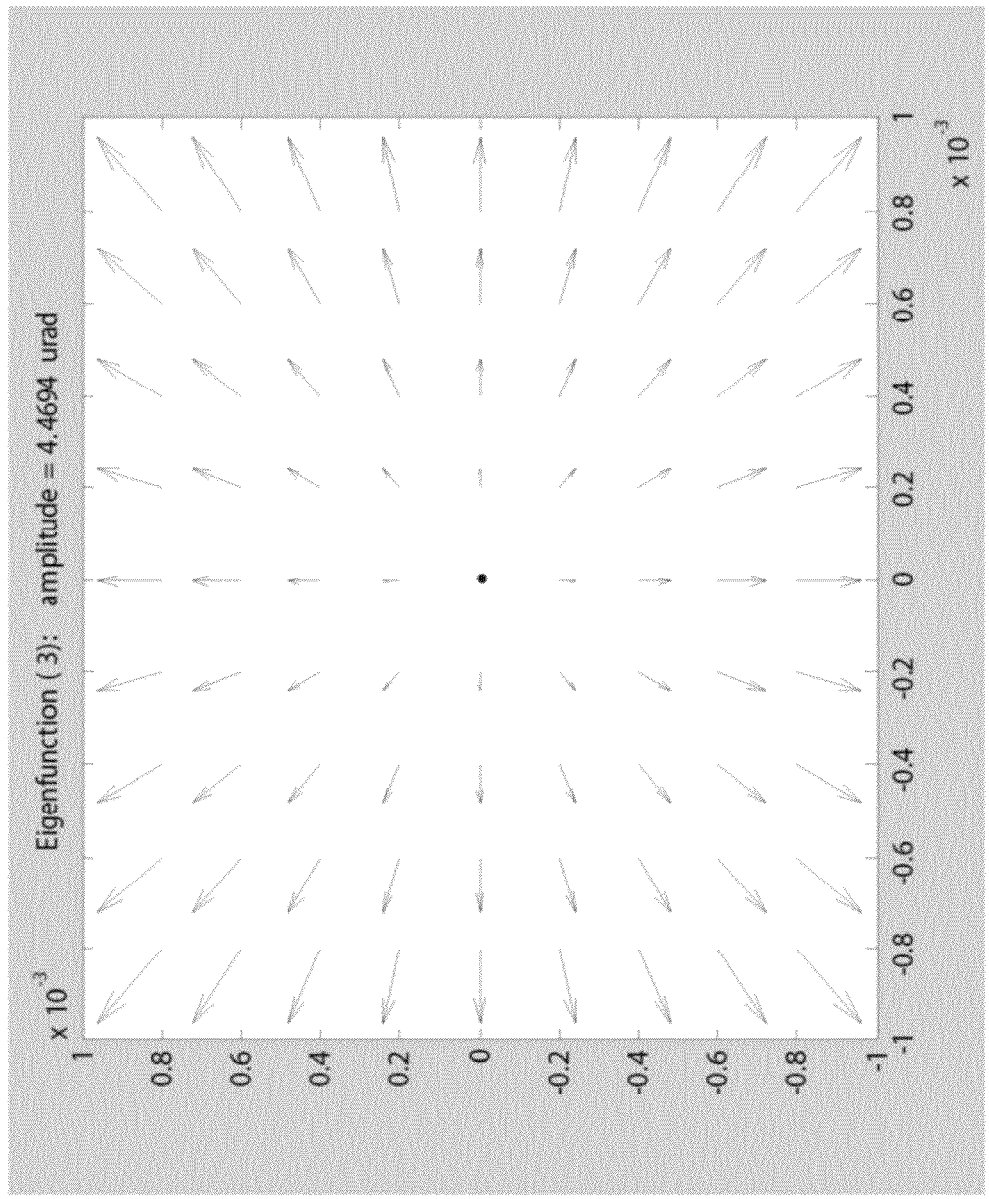
FIG. 6C shows a vector field of an exemplary transformation comprising a change in range (or focal length)
Figure 6D:
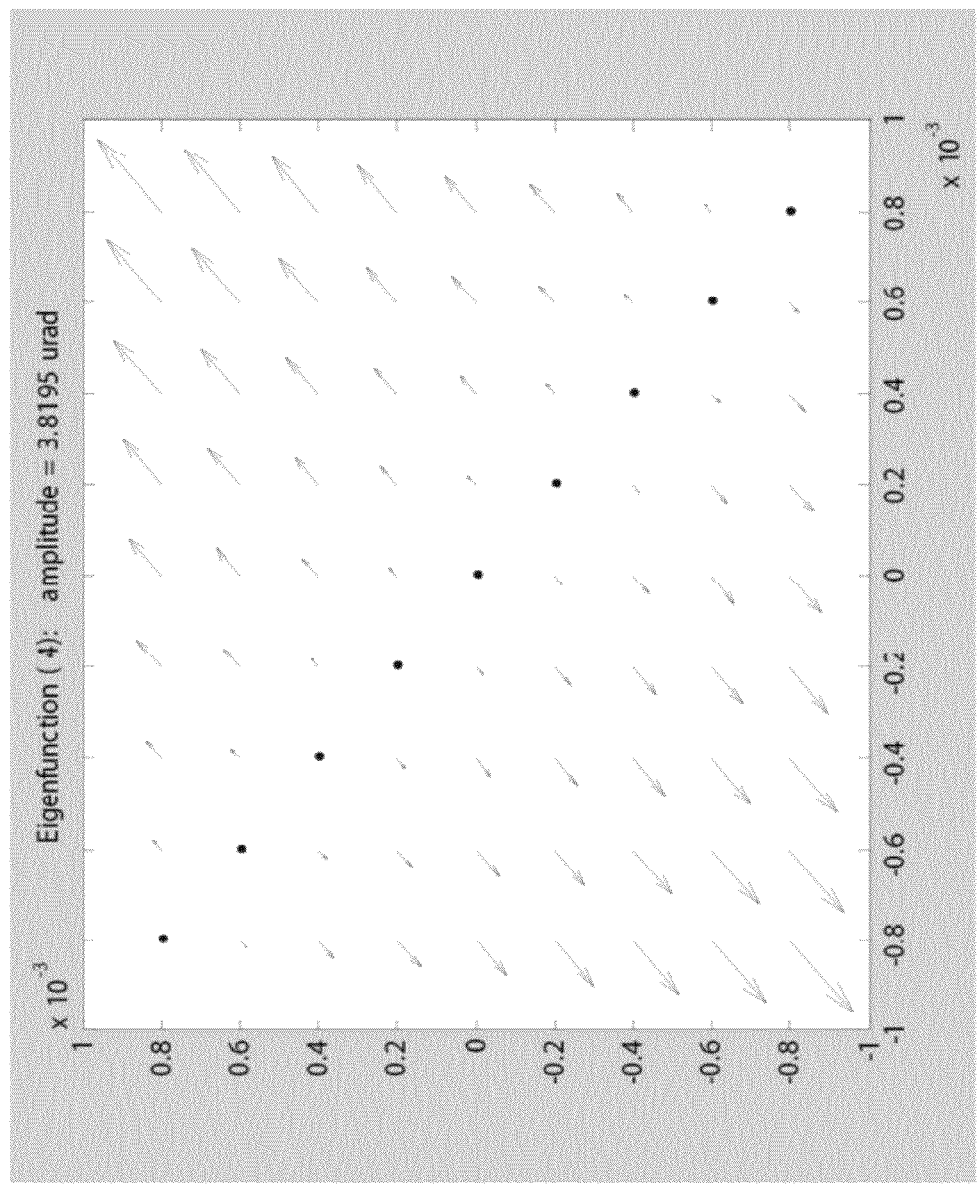
FIG. 6D shows a vector field of an exemplary transformation comprising an anamorphic stretch at 45° due to skew.

FIG. 5A shows imaging platform 105 having line-of-sight 525 moving with velocity V (i.e., approaches the reader in a direction perpendicular to the plane of the page). FIG. 5B shows initial field of view 105 and subsequent field of view 520 caused by skew change. Further, FIG. 5C shows an alternative depiction of skew as a vector field. The length of the vector corresponds to magnitude of the displacement from the line of site.

These and other detected inter-frame image changes due to movement of the imaging platform-based sensor may be corrected using the imaging system (and method) as described herein, in one or more embodiments, which digitally transforms successive images with respect to a common field of view such that the successive images appear to viewed from the same non-moving platform. The pixel size and orientation of pixels of each transformed image are the same or common.

FIGS. 6A-6D show vector fields associated with various eigenmode change transformations for providing the stationary view. In particular, they illustrate rotation, anamorphic stretch in the X-direction, a change in focal length, and anamorphic stretch at 45°, respectively, which may be performed by the imaging system (and method) according to embodiments. In addition there may be transforms for translation in azimuth and elevation, which are not shown.

Additionally or alternatively, the system (and method) may be configured to enable three-dimension (3-D) display and/or processing of image frames collected by the moving imaging platform-based sensor.

3-D imagery and the illusion of depth may be made possible by stereo or binocular vision (i.e., using both left and right eyes) along with visual perception processing by the human brain (or a machine). More particularly, the process in visual perception leading to the sensation of depth from the two slightly different projections of the world onto the retinas of the two eyes is known as stereopsis. The difference in the two retinal images, corresponding to the same object (or point) in scene, is called binocular disparity. The difference arises from the eyes' different positions with respect to the head, as discussed below.

The left and the right eyes are typically horizontally separated by about 50-75 mm (also known as interpupillary distance) in humans, depending on the individual. As such, the left eye and the right eye have a slightly different view of the world. The binocular disparity can be observed from apparent horizontal shift between both views. This effect is illustrated in FIG. 6A.

Figure 7A:
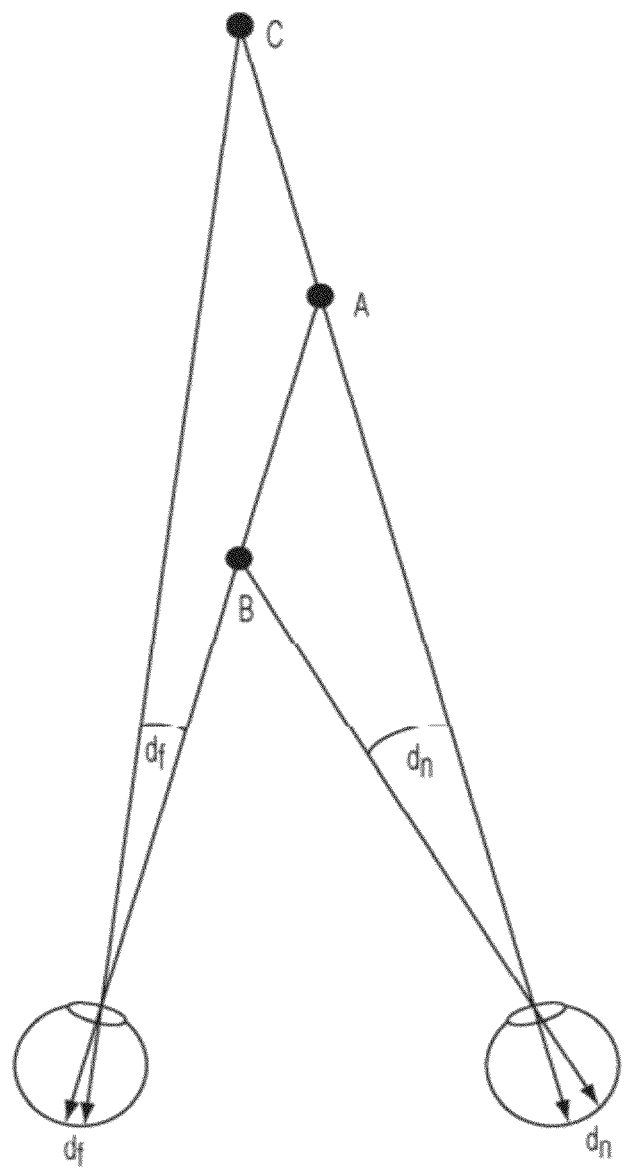
FIG. 7A is an exemplary illustration of binocular disparity for multiple points in a scene.

FIG. 7A is an exemplary illustration of binocular disparity for multiple points in a scene. Point A is a point of fixation and is equidistant for each of the observer's eyes. Point B lies somewhat nearer to the observer, and Point C lies somewhat further away from the observer, than point A.

Binocular disparity may be defined as the difference between the point of projection in the two eyes and is usually expressed in degrees as the visual (separation) angle. For example, when the line of sight of the two eyes meet at point A in scene, point A projects to the same location (i.e. the center) on the retinae of the two eyes. Thus, there is no visual disparity between when observing point A that is equidistance from both the left and right eyes. However, because of the different viewpoints observed by the left eye and the right eye, many other points, such as points B, C in space do not fall on corresponding retinal locations.

Consider point B, in which point B projects to approximately the same location (i.e., the center) as did point A in the left eye, since points A and B are substantially collinear with respect to the left eye. Yet, for the right eye, point B projects at an angle d, from the center of the retina. Thus, point B as observed will have a "near" disparity.

On the other hand, consider point C, in which point C projects to approximately the same location (i.e., the center) as did point A in the right eye, since points A and C are substantially collinear with respect to the right eye. Yet, for the left eye, point C projects at an angle $d_r$ from the center of the retina. Thus, point B as observed having a "far" disparity.

The brain uses binocular disparity to mentally process and extract depth information from the two-dimensional retinal images in stereopsis. For example, binocular disparity is the angle between two lines of projection in one eye. One of which is the real projection from the object to the actual point of projection. The other one is the imaginary projection running through the focal point of the lens of the one eye to the point corresponding to the actual point of projection in the other eye. For simplicity's sake, both objects lie on the line of fixation for one eye such that the imaginary projection ends directly on the fovea of the other eye, but in general the fovea acts at most as a reference. Note that far disparities are smaller than near disparities for objects having the same distance from the fixation point.

This same phenomenon of stereopsis can be implemented by an image processor (or other machines) to make 2-D images appear 3-D or having depth when viewed.

Figure 7B:
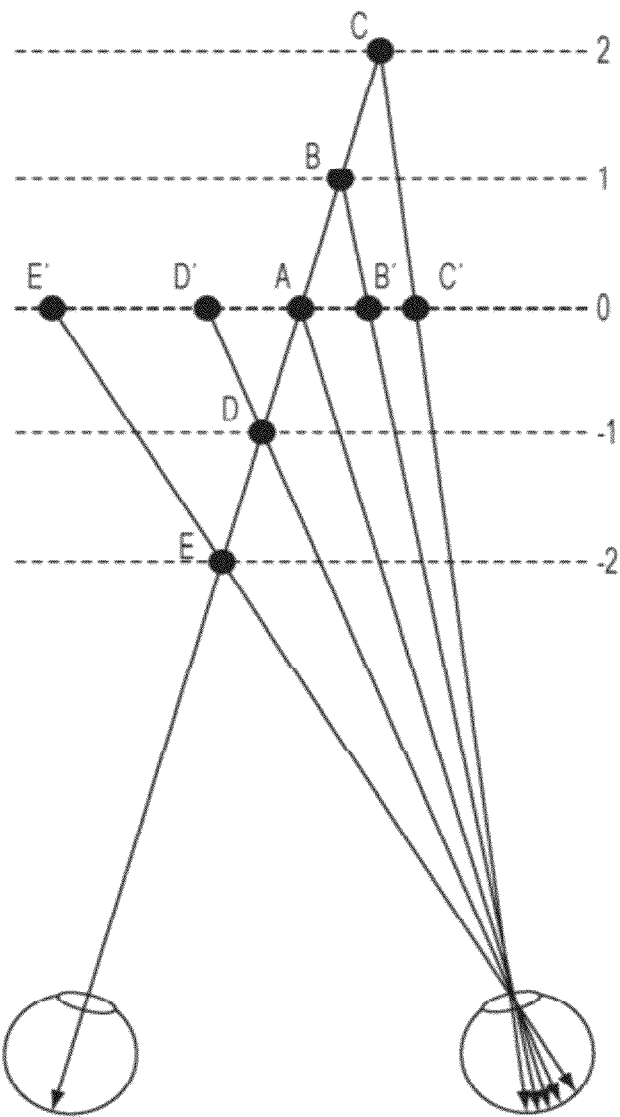
FIG. 7B shows using a 2-D image to a simulate depth the illusion of depth.

FIG. 7B shows using a 2-D image to a simulate depth. Point A is a point of fixation at depth value of 0 for both the left and right eyes. Objects in varying depths, from point A, may be placed along the line of fixation of the left eye, at points B, C, D, and E.

The same disparity produced from a shift in depth of objects for points B, C, D, and E can also be produced by virtually shifting object points B', C', D', and E' laterally along the same horizontal plane in constant depth (e.g., a depth value of 0) as point A that one eye sees. As apparent, for near disparities the lateral shift has to be larger to correspond to the same depth compared with far disparities.

Using this or similar techniques, pairs of images can be formed or selected for producing a 3-D perceptual effect when viewed. These may include, for instance, "stereoscopic" or "autostereoscopic," images.

"Stereoscopic" images include two separate 2-D images having different perspectives, one sent to each eye, which the human mind mentally "processes" as 3-D. One 2-D image can simulate the view from left eye. And, the other 2-D image can simulate the view from the right eye. When each 2-D image is viewed by the respective eye, stereopsis makes the 2-D images appear as a single image having depth. One type of stereoscopic imagery uses complementary color anaglyphs. Complementary color anaglyphs form respective images for the left and right eyes in complementary colors such as the colors red and cyan (blue) In order to ensure that each eye sees only the images meant for that eye, typically glasses including complementary color filters for each eye are worn by the observer. While the term "glasses" is used herein, it will be appreciated that glasses may be configured as eyeglasses, goggles, spectacles, eyepieces, eyecup, and/or other optical elements having two optical paths, one for each eye of the wearer, in keeping within the scope of this disclosure.

On the other hand, for "autostereoscopic" images, the same 2-D image is projected to each eye although some image processing (i.e., shading or other graphical techniques) of the image is performed before being actually viewed. The shading or graphical techniques ensure that the viewer's two eyes each see a different image. Examples of autostereoscopic displays include parallax barriers, lenticular lens, volumetric, electro-holographic, and light field displays. The human mind (or machine) processes image as having a 3-D-like appearance.

Pairs of images do not reveal the leaning; instead they provide input that the brain recognizes as 3-D. The leaning effect is a result of differential parallax. No 3-D glasses or separation of images is needed. The "height" can be may be accurately measured or estimated from the "lean" with minimal error using fewer frames and/or observations over a smaller angular variation than conventional stereo photography systems.

Figure 7E:
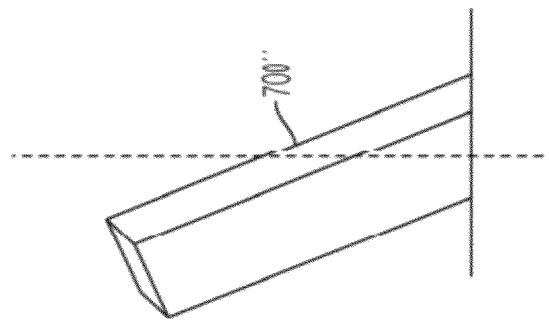
FIGS. 7C-7E illustrate an observed "leaning" effect for an image of an exemplary building.
Figure 7D:
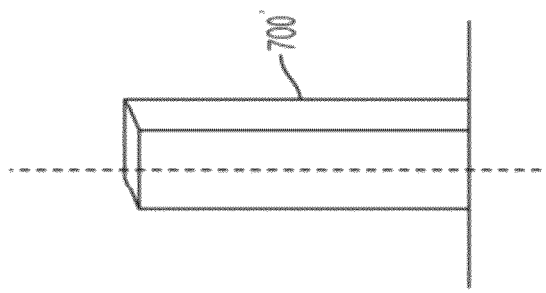
Figure 7C:
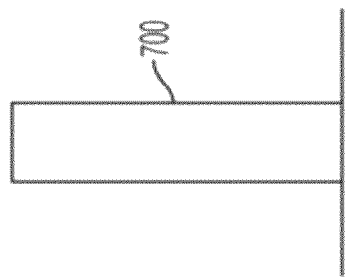

FIG. 7C illustrates a side view of exemplary building 700. FIGS. 7D and 7E illustrate 2-D images taken from an aerial imaging platform-based camera moving at a velocity. The camera is pointed to, or trained on (i.e., focused on) the building to take images thereof as the imaging platform moves. In many cases, the trajectory or direction of travel of the imaging platform can be determined, whether based on predetermined course. Similar, the orientation of the camera with respect to the imaging platform may be known.

FIG. 7D shows a first image of building 700' taken from the camera looking downwardly at building. In this image, substantially no portion of any of the sides of the building is visible. Building 700' appears generally parallel to an imaginary (dotted) line drawn in a direction perpendicular to the base of the building.

FIG. 7E shows a second image taken of building 700" some time later from the camera after the aerial imaging platform has moved from its position when the first image shown in FIG. 7D was taken. Building 700" appears skewed or leaning from an imaginary (dotted) line drawn in a direction perpendicular to the base of the building. This is because camera is no longer looking at the same vantage point (i.e., looking toward building), but from a slightly different vantage point (i.e., now from the right of the building).

The image separation between the first and second images is clear, although the degree of skew due to the image separation has been exaggerated for explanation purposes. The image separation θ may be determined, for instance, based on the altitude, A of the imaging platform with respect to the target and the distance d the imaging platform has moved between successive images of the target. In one instance, the tangent of the image separation θ may be approximated to be equal to the altitude A divided by the distance moved d, according to equation (1).

$$\tan\theta = \frac{A}{d} \quad (1)$$

And, if the imaging platform is moving at a constant velocity V, then d=Vxt, where t is the time between the successive images taken.

In FIG. 7E, some of the side portion of the building in the direction that the image platform is moving is visible in the image. As such, building 700" appears to "lean" slightly away from the direction of movement of the imaging platform in the figure. The building is not actually leaning. Nor is this leaning an actual change in the image due to motion of the imaging platform. Merely it is the residual motion after frame-to-frame correction has been applied to a 2-D reference plane. According to an aspect of the disclosure, this deterministic leaning is not removed during the image transformation, but rather may be used for determining a height, an elevation, or other three-dimensional information associated with the tracked target, among other things.

In some instances, the degree (i.e. the amount or angle) of lean along predicted, a deterministic path or track of motion of the imaging platform may be proportional to the height, elevation, or other three-dimensional information of a target associated with the scene.

Figure 8:
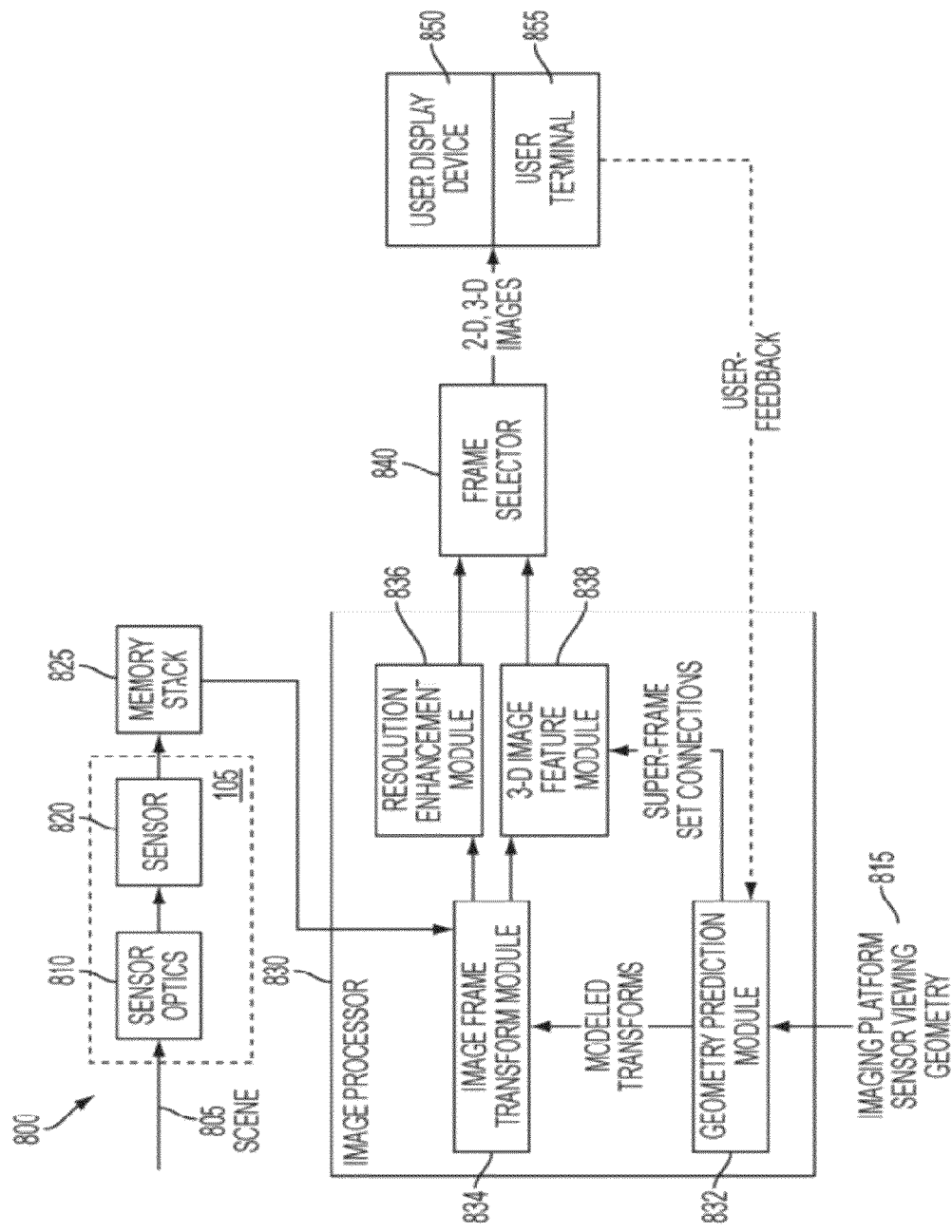
FIG. 8 shows a schematic of an exemplary imaging system or correcting inter-frame image change for 3-D persistent observations due to motion, according to an embodiment.

FIG. 8 shows a schematic of an exemplary imaging system 800 for correcting inter-frame image change for 3-D persistent observations, according to an embodiment.

System 800 captures one or more images of scene 805 via sensor optics 810, which may comprise multiple reflective and/or transmissive lens elements. Images of scene 805, as modified by sensor optics 810, and focused onto sensor 820.

More particularly, sensor optics 810 receives electromagnetic radiation (light) from scene 805 and focuses the received electromagnetic radiation (light) onto sensor 820. In one implementation, sensor optics 810 may include an objective lens, or other conventional optics, such as one or more mirrors and/or lenses.

Sensor 820 may be mounted on a moving platform, such as an airborne or space-based imaging platform 105 that is configured to collect image frames. Sensor 820 may include any two-dimensional (2-D) sensor configured to detect electromagnetic radiation (light) corresponding to the entering light of interest and generate image frames, whether still or video image. Exemplary electromagnetic radiation detectors may include complementary metal-oxide-semiconductor (CMOS), charge-coupled device (CCD), or other detectors having sufficient spectral response to detect electromagnetic radiation (light) of interest, for example, in the infrared (IR), visible (VIS), and/or ultraviolet (UV) spectra. In one implementation, sensor 820 may be a focal plane array (FPA) sensor.

The relative motion between imaging platform 805 and scene 805 can be determined to minimize motion, oscillation, or vibration induced frame-to-frame image changes. A variety of sources can provide input data 815 describing the relative motion of imaging platform to the target and viewing geometry of the sensor relative to the imaging platform 105.

For example, imaging platform 105 may have a predetermined ground track (e.g., deterministic path) for imaging selected terrain. Accordingly, input data 815 may comprise control data specifying the route and/or trajectory of imaging platform 105. Input data 815 can also be provided by one or more trajectory sensors (not shown), either alone or in combination with control data, to directly detect the motion of imaging platform 105 or the relative motion between imaging platform 105 and scene 805. According to various embodiments, trajectory sensors can include inertial, global positions system (GPS), image processors, velocity (speed), acceleration, etc.). They may include mechanical, electro-mechanical, piezoelectric, optical, sensors, radar (ladar) of the like, which are included with the flight systems or avionics of imaging platform 105 or otherwise separately provides. Trajectory sensor(s) may be configured provide to provide various data, including one or more of: velocity (speed), directional heading, and angular heading, for example, of moving imaging platform 105. Data output from sensor 820 may be configured for Cartesian coordinates, Polar coordinate, cylindrical or spherical coordinates, and/or other reference coordinate frames and systems. In one implementation, imaging platform 105 may implement a World Geodetic System WGS-84 oblate Earth coordinate frame model.

Image processor 830 is configured to receive image frames from sensor 820 (and other data gathering devices, such as trajectory sensors or the like) and perform image processing, as discussed herein. Image processor 830 may include hardware, such as Application Specific Integrated Circuits (ASICs), Field Programmable Gate Arrays (FPGAs), digital signal processors (DSPs), or other integrated formats. However, those skilled in the art will recognize that processor 830 may, in whole or in part, be equivalently implemented in integrated circuits, as one or more computer programs having computer-executable instructions or code running on one or more computers (e.g., as one or more programs running on one or more computer systems), as one or more programs running on one or more processors (e.g., as one or more programs running on one or more microprocessors), as firmware, or as any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of computer-readable medium used to carry out the distribution.

In some embodiments, image processor 830 may be located directly on imaging platform 105 and/or with sensor 820. As such, the transformed imagery can be directly transmitted to users who can view the imagery with a stereo 3-D display without the need for any additional image processing. However, this need not be the case. Thus, in some embodiments (as shown), image processor 830 may be separate from imaging platform 105. For instance, image processor 830 may be ground-based (such as, at a command center). In other instance, image processor 830, vehicle-based, such as, for example, in an automobile, tank, helicopter, airplane, ship, submarine, or the like. Of course, image processor 830 might also be located with users, such as within a display device 850, user terminal 855 or other portable device.

Sensor 820 and image processor 830 may communicate and/or share information and data, preferably, in "real-time," via one or more connections and/or networks there between. Sensor 820 may transmit image frames, trajectory information, sensor viewing information to image processor 830 by any means (including, for instance, radio, microwave, or other electromagnetic radiation means, optical, electrical, wired or wireless transmissions or the like). In addition, networked communication over one or more digital networks, such as intranets and Internet are possible.

In some instances, memory device 825 (which may also be referred to as a cache or stack) may temporarily or permanently store image frames collected by sensor 820 for subsequent processing by image processor 830. Memory device 825 may be located, for example, with sensor 820 (as shown) or alternatively with image processor 830.

As shown, image processor 830 may include geometry prediction module 832, image frame transform module 834, resolution enhancement module 836, and 3-D image feature module 838. According to various embodiments, the processes described can be implemented with a variety of microprocessors and/or software, for example. In some implementations, one or more modules (of their functionality) may be combined or omitted. Other modules and functions are also possible. Further, image processor 830 can be implemented onboard and/or off-site of imaging platform 105 (e.g., at a ground location physically separated from imaging platform 105).

For example, image processor 830 may be configured to utilize planar, spherical, or oblate earth models, relief or topographic models, 3-D models of man-made objects, and/or terrain elevation maps.

Geometry prediction module 832 is configured to determine the nature and degree of change between different images collected by sensor 820, by receiving input data 815 and determining one or more transformation functions which mathematically describe the inter-frame change due to movement of imaging platform 105 and/or sensor 820 relative to a target in scene. In one embodiment, the transformation may be eigen transformations with each eigenfunction being directly translatable into a digital adjustment of image data for counteracting and/or preventing the determined inter-frame changes.

Image frame transform module 834 receives the modeled transformation data from geometry prediction module 832 and is configured to digitally transform the image frames, such that the image frames from sensor 820 appear as viewed from the same fixed or non-moving imaging platform. In particular, image frame transform module 834 may be configured to digitally transform successive images of the target with respect to a common field of view (FOV) such that the successive images appear to viewed from the same non-moving platform. For example, the Eigen transformations may comprise rotation, zoom, anamorphic stretch in azimuth (or X-axis of the focal plane assembly), anamorphic stretch at 45° (from X-axis), anamorphic stretch in elevation (Y-axis), and/or anamorphic stretch at −45° (from X-axis).

In one embodiment, the transformations can be applied to successive frames based on the eigenmodes to remove changes in images due to platform motion, such that each frame appears to be collected from the fixed or non-moving vantage point. In some implementations, the system may use one or more of the a priori eigenfunctions described in U.S. patent application Ser. No. 12/425,188, mentioned above. According to various embodiments, additional or alternative transformations may be used. In particular, for example, an airborne-based or space-based platform may use rotation, anamorphic stretch in azimuth, zoom, and anamorphic stretch at 45° (from X-axis) to correct inter-frame image change due to relative motion of the imaging platform.

Resolution enhancement module 836 is configured to enhance the resolution of transformed image frames collected from sensor 820. The resolution of imagery can be increased by interpolating and transforming imagery to remove apparent motion of successive frames, increasing sampling of aggregate images due to naturally occurring movement of pixels as mapped to the ground. This may be further aided by deterministic frame shifting.

In one implementation, a resolution enhancement process may be implemented by resolution enhancement module 836. Images of improved resolution images, for example, may be generated by interpolating and aggregating images according to known algorithms, such as frequency or space domain algorithms. The images are not highly oversampled per se but a sequence of images that are ultimately aggregated become highly oversampled by virtue of recognizing the naturally occurring changes in the sensor field of view and then creating a tailored, non-uniformly spaced interpolation grid based on these naturally occurring changes. One benefit of super-resolution processing is improved edge contrasts. In some instances, the enhanced images may enable a high "rating" according to the National Imagery Interpretability Rating Scale (NIIRS). Additional sub-pixel steering of the field of view may be employed to further enhance the sampling of the scene.

3-D image feature module 838 is configured to estimate and/or measure the elevation, height (or depth), or other three-dimensional information of one or more objected features appearing in the image frames collected by sensor 820. It may do so by identifying and tracking the motion of edges and texture features in imagery that move along deterministic paths or tracks that generally correspond to movement of imaging platform 105. The predetermined paths may be automatically-determined or selected and/or user-selected.

In one implementation, height estimations or measurements of various three-dimensional features in scene may be based on observed object motion over an angular separation or span of about 5 degrees. The image frames can be registered using eigenfunctions, such as, for instance, discussed in U.S. patent application Ser. No. 12/425,188, mentioned above. Object height estimates or measurements may be overlaid with, or coded, with the image frame for display. In some implementations, sensor 820 orientation (e.g., camera pose) with respect to the moving imaging platform 105 may be known.

Frame selector 840 is configured to select one or more frames for 2-D and/or 3-D display. Such display selection may be automatic or user-selected. For 3-D display modes, for instance, stereoscopic image pairs can be created from 2-D image frames which have been collected via sensor 820, whether the images may been corrected by image frame correction module 834 or not.

Images for a left-right stereoscopic pair may be selected from among the 2-D images that were collected by sensor 820. There may be multiple ways to choose which images to select and use together as a left-right stereoscopic image pair. For example, one approach may be for the user to select the time separation between images collected by sensor 820 and/or retrieved from memory 825. In other instances, the time separation may be automatically selected or a default value used. The time separation may range, for instance, from 30 to 3,000 ms.

A second approach to determine the left-right stereoscopic image enables a user to select the separation based on desired angular separation between images, which in turn would utilize the knowledge of imaging platform geometry and sensor pointing, similar as used by geometry prediction module 832. In other instances, the angular separation may be automatically selected or a default value used. The angular separation may range, for instance, 5 degrees. For either of these approaches, an image frame data stream could be processed repeated times with different stereoscopic separations to try and optimize stereo interpretability. Also, for either of these methods, once a fixed time separation between frames is established, stereoscopic frames may be generated using stereoscopic image pairs selected from the video stream. A "movie," for instance, may use a fixed time separation or a progressive time separation The output display may be an enhanced resolution 2-D images and/or 3-D stereoscopic image pairs corresponding thereto. Thus, no additional digital image processing may be necessary by the viewer.

One or more users can interface with system 800. Users typically will be located remotely from imaging platform 105 and/or image processor 830, for instance. Of course, users may also be located on imaging platform 105, and/or a location near image processor 830. In one or more implementations, users can communicated with, and/or share information and data with image processor 830 by any means (including, for instance, radio, microwave, or other electromagnetic radiation means, optical, electrical, wired, and wireless transmissions or the like). In addition, networked communication over one or more digital networks, such as intranets and Internet are possible.

User display 850 is configured to enable one or more users to view images in 2-D and/or 3-D modes from image processor 830.

User display 850 may include, for instance, any display device configured for displayed video and/or image frames. Televisions, computer monitors, laptops, tablets computing device, smart phones, personal digital assistant (PDAs) and/or other displays and computing devices may be used. Exemplary display devices may include a cathode ray tube (CRT), plasma, liquid crystal display (LCD), light or emitting diode (LED) display, for example.

In some instances, image frames may, alternatively or additionally, be printed by a printing device and/or stored in a memory or media storage device (not shown). Additional image processing may be further performed on the output signal (or image), if so desired, such as, for example, noise filtering, cropping, resizing, color-coordination, annotation, etc.

User terminal 855 is configured to enable user to interact with image processor 830. In some implementations, users may be presented with one or more planning tools to extract 3-D height fidelity, schedules constraints on revisits, number of frames, and/or pointing angles. In particular, user terminal 855 permits users to provide feedback to image processor 830. In one implementation, feedback can by used by image processor 830 to correct by geometry prediction module 832 to better correct image misalignment.

In some embodiments (as shown), user display 850 and user terminal 855 may be incorporated into the same device or system. However, it will be appreciated that user display 850 and user terminal 855 could be separate devices or systems. And, while only one user display 850 and user terminal device 855 is illustrated in the figure, it will be appreciated that additional user displays and terminal devices may be provided for multiple users and/or at multiple locations, as desired.

Figure 9:
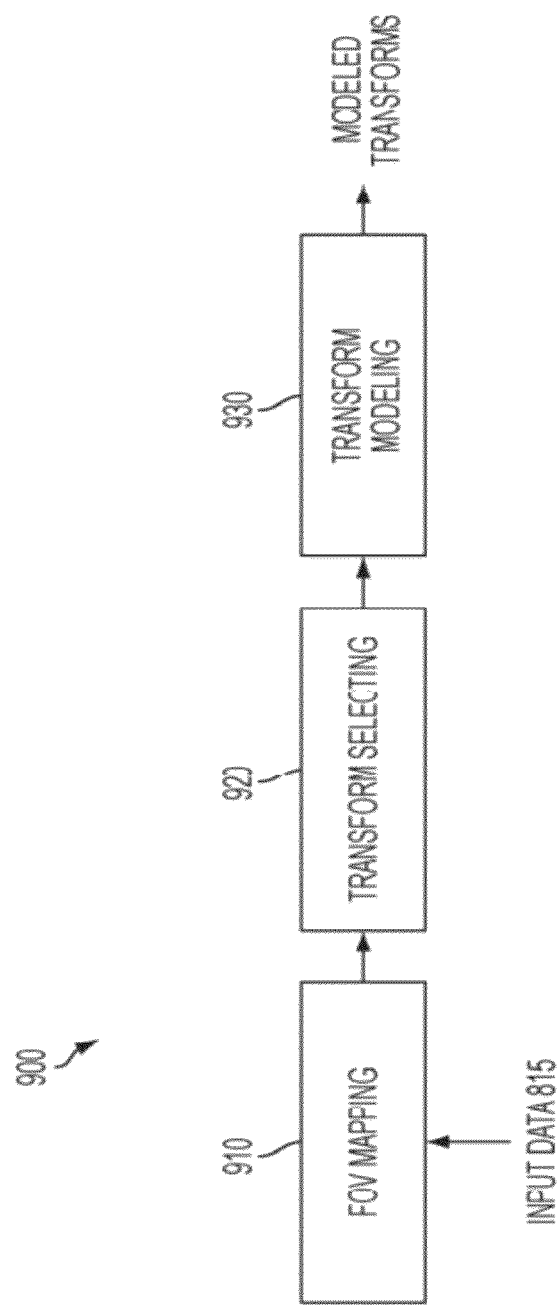
FIG. 9 shows an exemplary schematic for processing performed by a geometry prediction module, in accordance with an embodiment.

FIG. 9 shows an exemplary schematic for processing 900 performed by geometry prediction module 832 (FIG. 8), in accordance with an embodiment. Geometry prediction module 832, can receive input data 815 indicating the relative motion, trajectory of imaging platform 105 and sensor viewing geometry, which is used to output one or more model eigenfunctions to correct for image change.

Geometry prediction module processing 900 may include field of view (FOV) mapping 910, transform selecting 920, and transform modeling 930.

FOV mapping 910 receives input data 815 and computes inter-frame FOV mapping for each to the ground for each set of image frames. This may include, for example, taking the difference between different image frames on a pixel-by-pixel basis. For video, these may be successive frames.

Transform selecting 920 selects one or more image transformations to correct for the inter-frame differences in the FOV determined in step 810. For instance, the changes between the initial and subsequent FOV are modeled by transformations (e.g., Eigen transformations). Transformations can describe a set of adjustments which are capable of compensating for all image changes induced by platform motion. In particular, they may comprise one or more of: rotation, zoom, anamorphic stretch in azimuth (or X-axis of the focal plane assembly), anamorphic stretch at 45° (from X-axis), anamorphic stretch in elevation (Y-axis), and/or anamorphic stretch at −45° (from X-axis).

Transform modeling 930 may be performed to find "best-fit" coefficients for each eigenmode for the one or more eigen transformations determined in step 920. The transformations may be optimized by calculating "best fits" or coefficients to minimize mean-square error (MSE) or the maximum error, for example. After calculating best fits, the modeled Eigen transformations characterizing correcting image distortion are outputted to image frame correction module 834 so as to digitally transform images.

FIGS. 10-14 show an example of correcting frame-to-frame image change due to motion of imaging platform 105 relative to the ground. In this example, four eigen transformations (i.e., rotation, zoom, anamorphic stretch in x-axis, and anamorphic stretch along 45°) are performed. In addition, the best fit for each eigen transformation is determined by minimizing the mean-square error.

These plots depict the relative motion of pixels between two different images taken at different instances in time. The plots map the movement of the pixels to the ground. The length and direction of the vector arrows show the movement of pixels from one frame to another.

Figure 10:
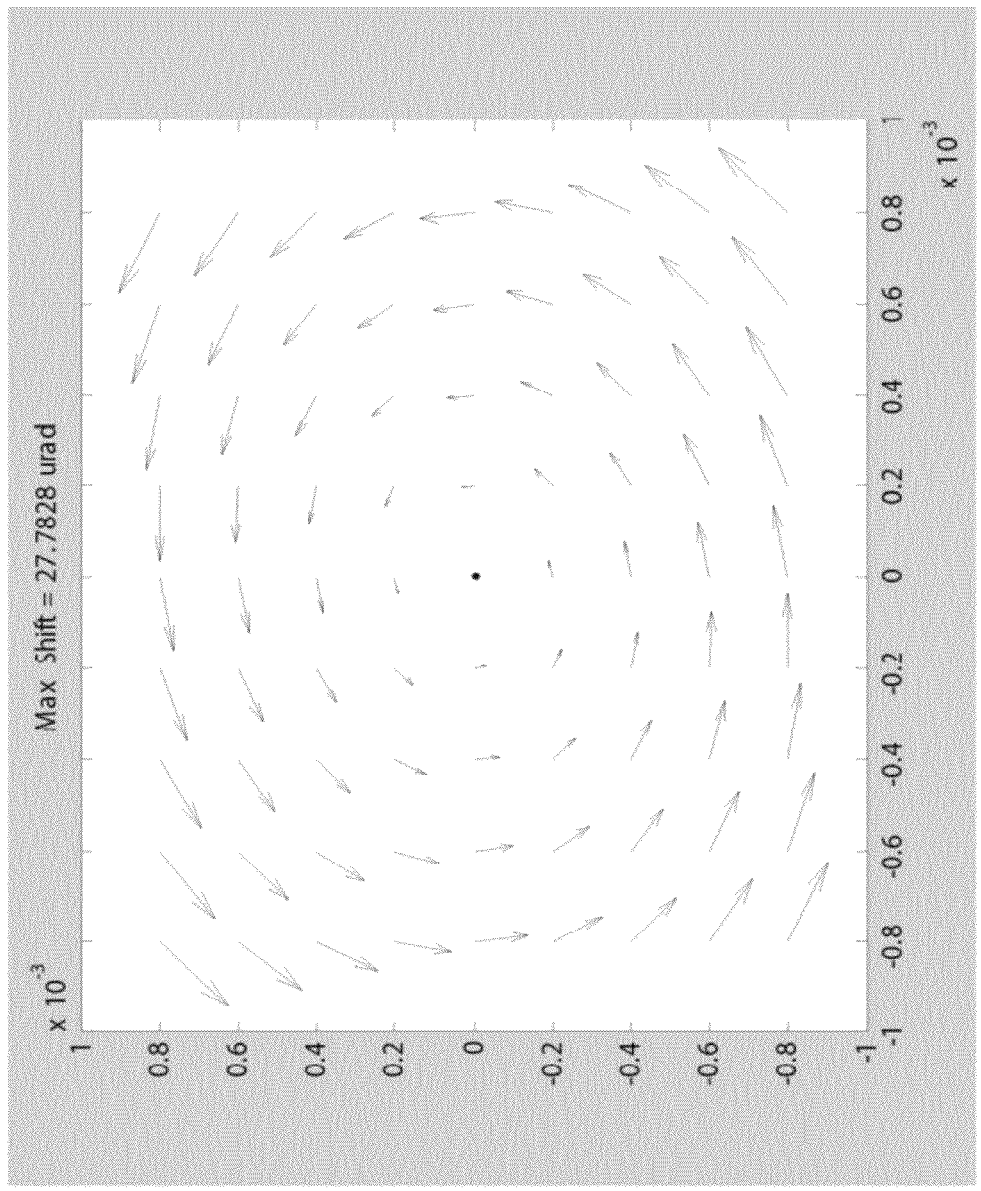
FIG. 10 shows a vector field of the overall image change of a scene viewed for one second over a field of view of 1.6 mrad from an altitude of 600 km.

FIG. 10, in particular, shows a vector field of the overall direction and magnitude of image change viewed by imaging platform 105 for one second over a field of view of 1.6 mrad (i.e., approximately one km) from an altitude of 600 km. FIG. 10 also shows that that the maximum image change is approximately 28 μrad per second.

Figure 11:
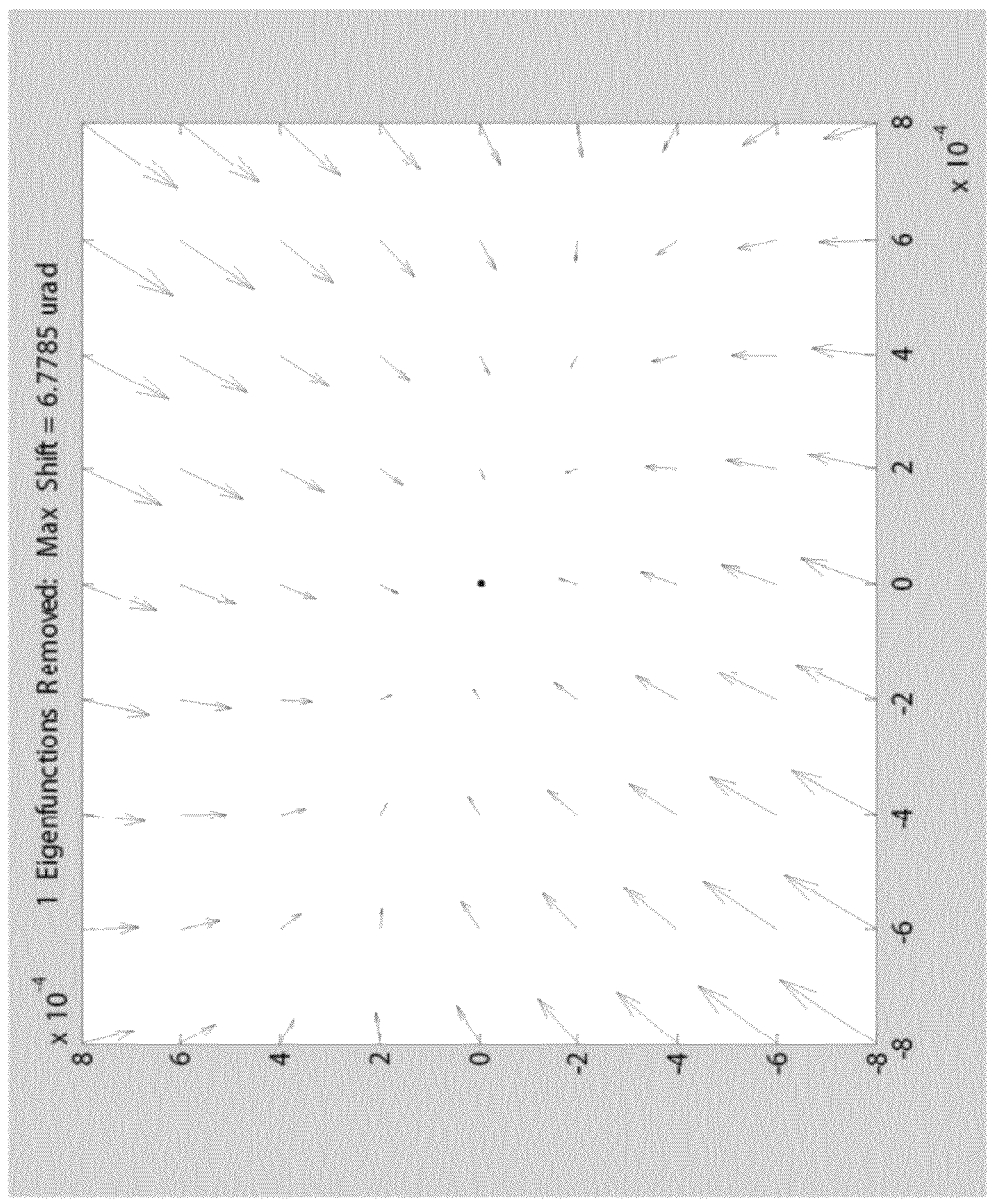
FIG. 11 shows the image changes remaining after correcting for rotation.

FIG. 11 shows the remaining image change after performing a rotational correction. Removing rotation alone reduces the maximum image change to approximately 6.8 μrad per second.

Figure 12:
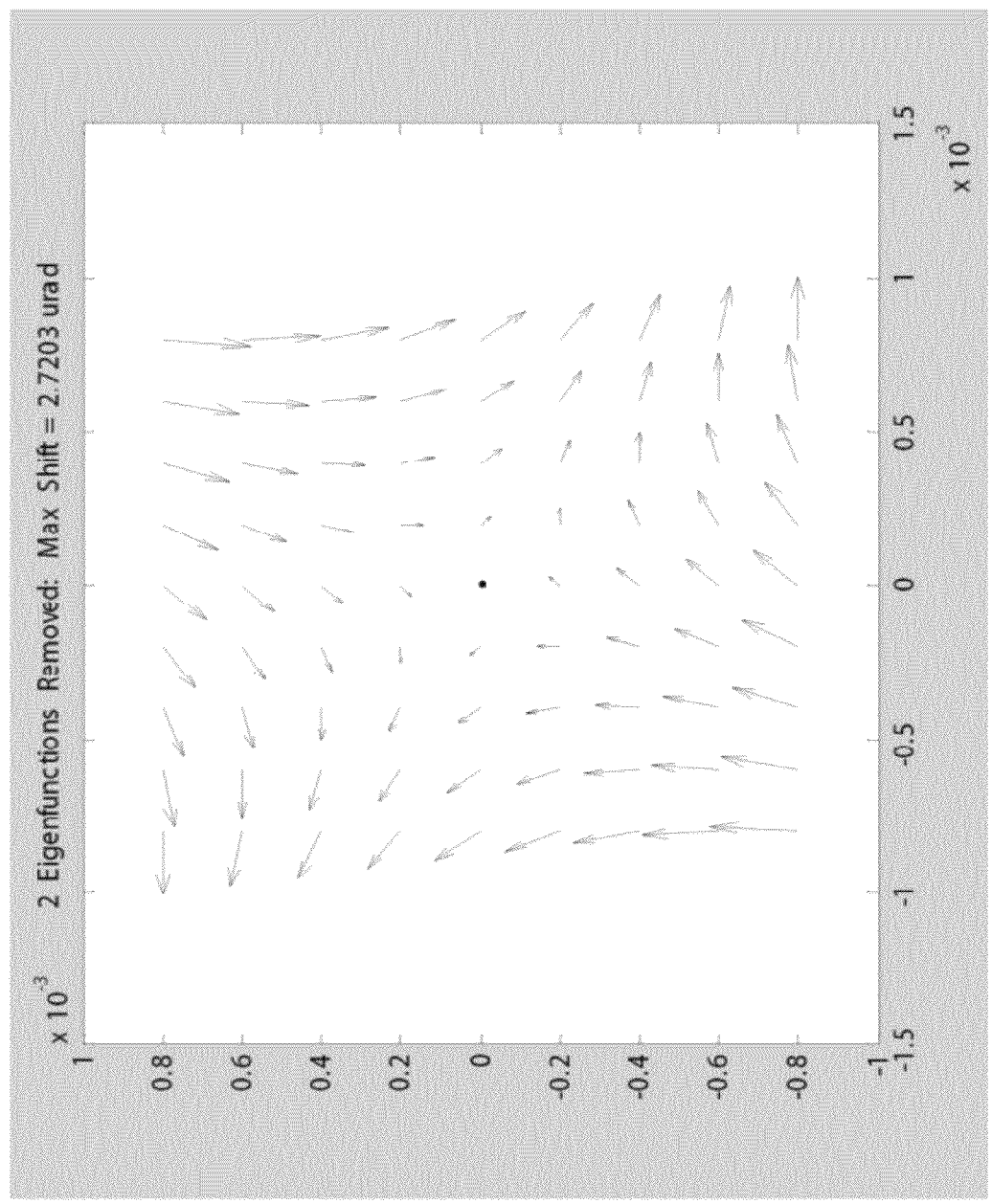
FIG. 12 shows the image changes remaining after correcting for zoom.

FIG. 12 shows the change remaining after correcting for rotation and zoom (focal length). Removing zoom, in addition to rotational image change, reduces the maximum image change to approximately 2.7 μrad per second.

Figure 13:
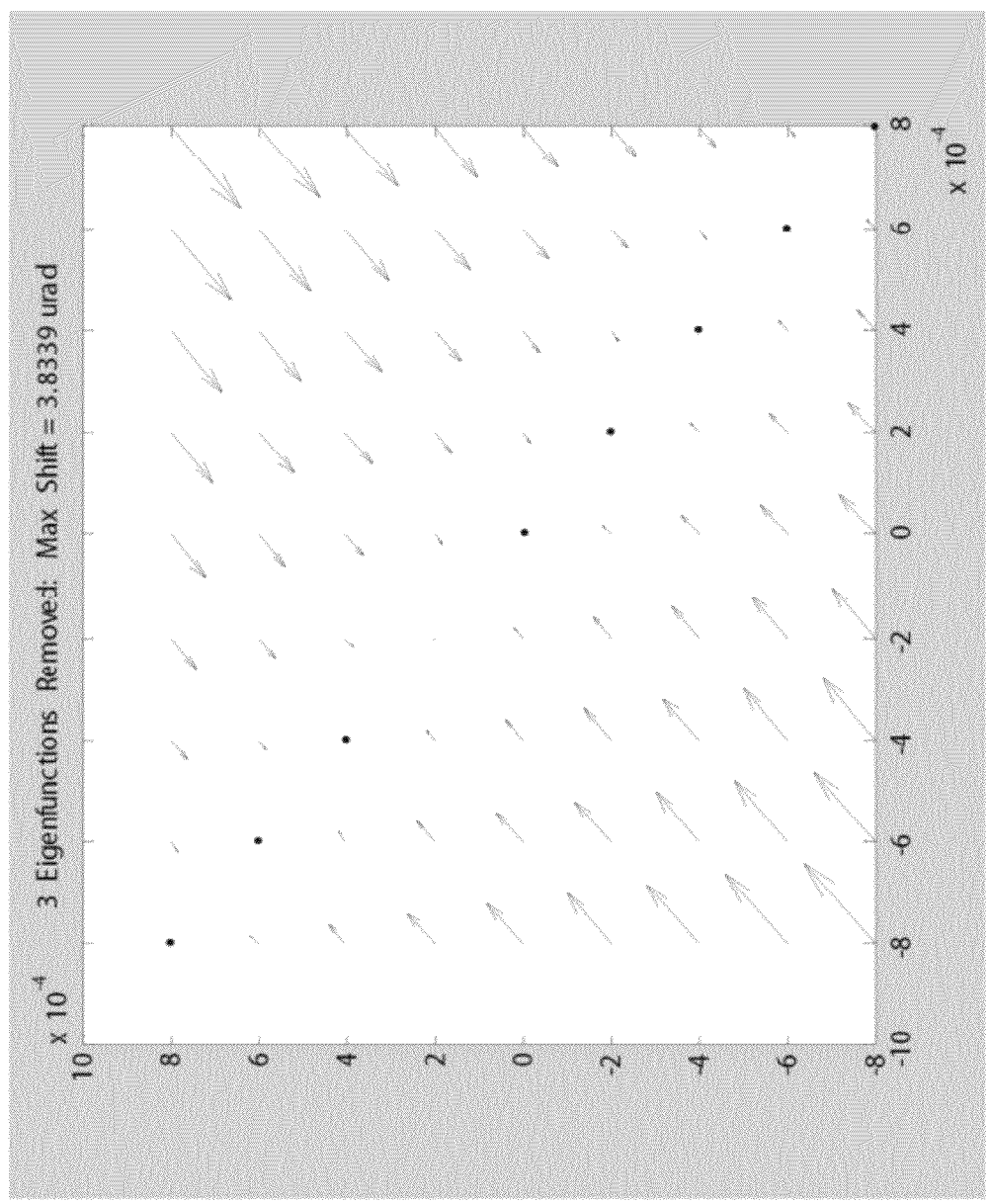
FIG. 13 shows the image changes remaining after correcting for anamorphic stretch along the x-axis.

FIG. 13 shows the change remaining after correcting for rotation, zoom and anamorphic stretch along the x-axis. Removing anamorphic stretch along the x-axis results in a maximum change of approximately 3.8 μrad per second.

Figure 14:
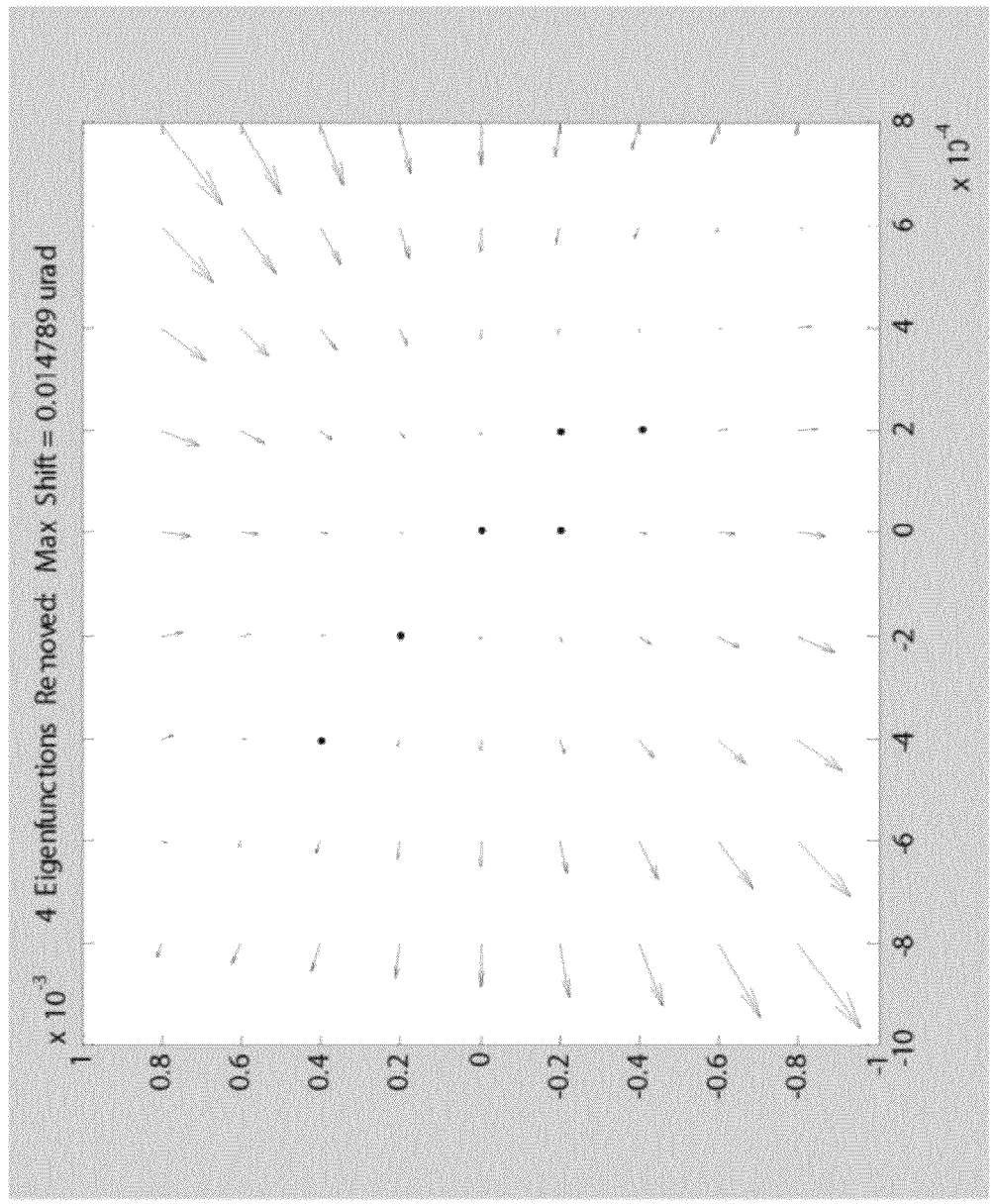
FIG. 14 shows the image changes remaining after correcting for anamorphic stretch at 45°.

FIG. 14 shows the image change remaining after correcting for correcting for rotation, zoom, anamorphic stretch along the x-axis and anamorphic stretch at 45°. Removing anamorphic stretch at 45° reduces the maximum change to approximately 0.015 μrad per second.

According to various embodiments, the imaging platform or user may also select other combinations and sequences of the transformations described with respect to FIGS. 10-14.

In alternative embodiments, homography techniques may be used for correction for image change instead of eigenfunctions. Homography includes an invertible transformation from the real projective plane to the projective plane that maps straight lines to straight lines. Such algorithms are known in the art. For instance, there may be a formal pose-based homography matrix that can be computed in place of the eigentransforms.

Figure 15:
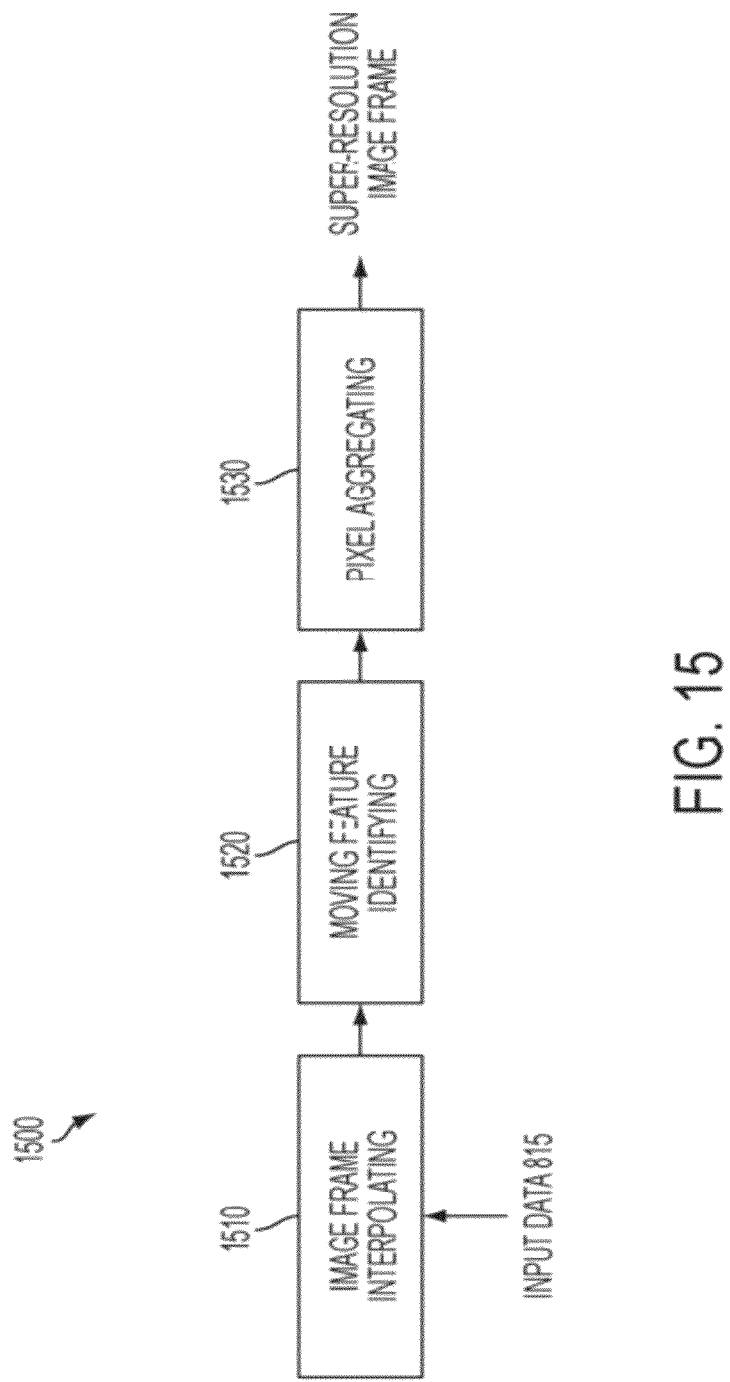
FIG. 15 shows an exemplary schematic for processing performed by a resolution enhancement module, in accordance with an embodiment.

FIG. 15 shows an exemplary schematic for processing 1500 performed by resolution enhancement module 834 (FIG. 8), in accordance with an embodiment. Resolution enhancement module 834, can receive input data 815 and output an enhanced image frames. In one implementation, the enhanced image frame may be an oversampled aggregate super-resolution frame.

Super-resolution module processing 1500 may include frame interpolating 1510, moving feature identifying 1520, and pixel aggregating 1530.

Frame interpolating 1510 interpolates frames to a common oversampled grid using sensor pointing information included in, and/or derived from input data 815. In some instance, a conventional super-resolution (SR) algorithm may be used. However, conventional super-resolution techniques, such as drizzle, may need to use actual image frame data to determine a common overlap grid. On the other hand, according to an embodiment, super-resolution may be automatically performed by applying the Eigen transforms to the image frames.

Figure 16:
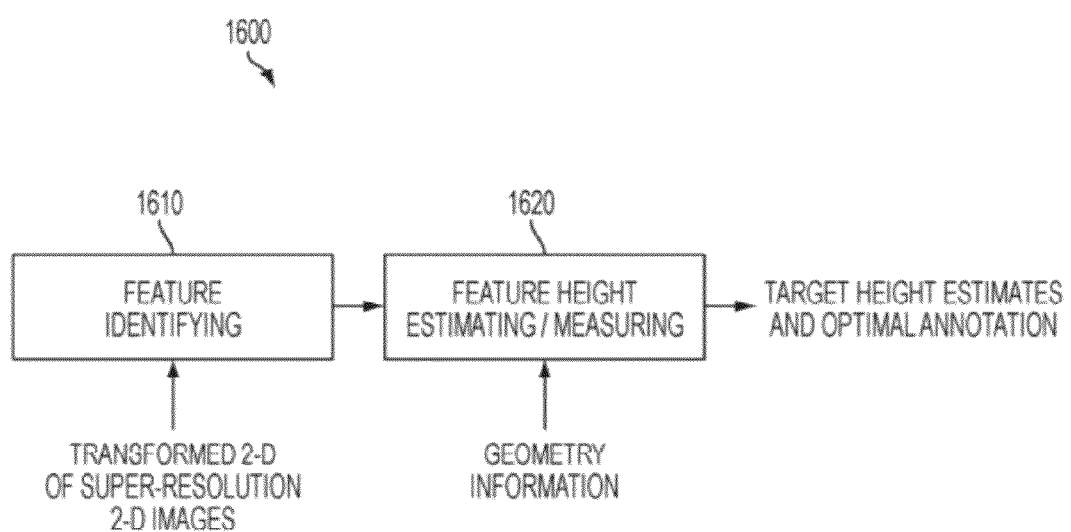
FIG. 16 shows an exemplary schematic for processing performed by a 3-D image feature module, in accordance with an embodiment.

FIG. 16 shows an exemplary schematic for processing 1600 performed by 3-D image feature module 838 (FIG. 8), in accordance with an embodiment. 3-D image feature module 838, can receive original, transformed and/or super-resolution 2-D images, and geometry information regarding the scene, which are used to output target height estimate and optionally, annotation for 2-D, and stereoscopic images for 3-D, display.

3-D image feature module processing 1600 may include object feature identifying 1610 and feature height estimating/measuring 1620.

Object feature identifying 1610 receives 2-D images or super-resolution 2-D images and identifies object features in the image frames which correspond to target objects in the scene having an positive (or negative) elevation or altitude with respect to the a plane, such as the ground. These may include, but are not necessarily limited to: edge detection, texture detection, shape filtering, corner detection, local maxima detection, or frame difference detection. Edge detection techniques which may be used in accordance with embodiments are discussed, for example, in E. Nadernejad, "Edge Detection Technique: Evaluation and Comparisons" Applied Mathematical Sciences, Vol. 2, 2008, no. 31, pp. 1507-1520, herein incorporated by reference in its entirety. Feature height estimating/measuring 1620 receives geometry information regarding the scene and determines target height estimate or measurement for the features identified in step 1610.

First, the geometry information may be converted into a direction of motion for identified object features which have a height at different points in the FOV of the image. Next, the relative motion of features is calculated in the determined direction of motion. This may be accomplish, for example, using a simple Kalman filter or other known estimation/tracking techniques.

Height or other 3-D information may then be extracted from corrected images output from image frame transform module 836.

The image change compensation scheme (using digital correction) may be optimal for one plane in 3-D space. Objects in the plane of optimization appear not to move, but objects at altitudes or elevations (other than the plane of optimization) may exhibit residual motion/lean in the primary direction of platform movement. Following transformation, it has been found that the amount of lean is linearly proportional to object height. Therefore, the motion observed for objects in a transformed image can be used to extract analytically the height of objects using the same transformations used by the geometry prediction module 832, and using the same a priori knowledge of platform state and attitude. For instance, users may be presented with one or more pictorial templates to identify system pointing errors and to provide correction using drag and drop tools.

In one approach, this analytical height extraction is performed using the local ground plane as the plane of optimization. Of course, other planes might also be used, as so desired.

Another approach may involve making multiple assumptions for the height of the correction plane. In this case, one could extract off-plane height for features based on amount of lean observed for each trial correction plane (probably two or three), then interpolate/extrapolate results for given features in the height dimension.

For a side-looking sensor positioned on a moving imaging platform, the height of an observed target may be well-approximated using equation (2):

$$\text{height} = \frac{d}{\tan\theta} \quad (2)$$

where d is the observed target point displacement and e is the angular separation between image frames (views) in the plane defined by the target point and the imaging platform velocity vector.

Figure 17A:
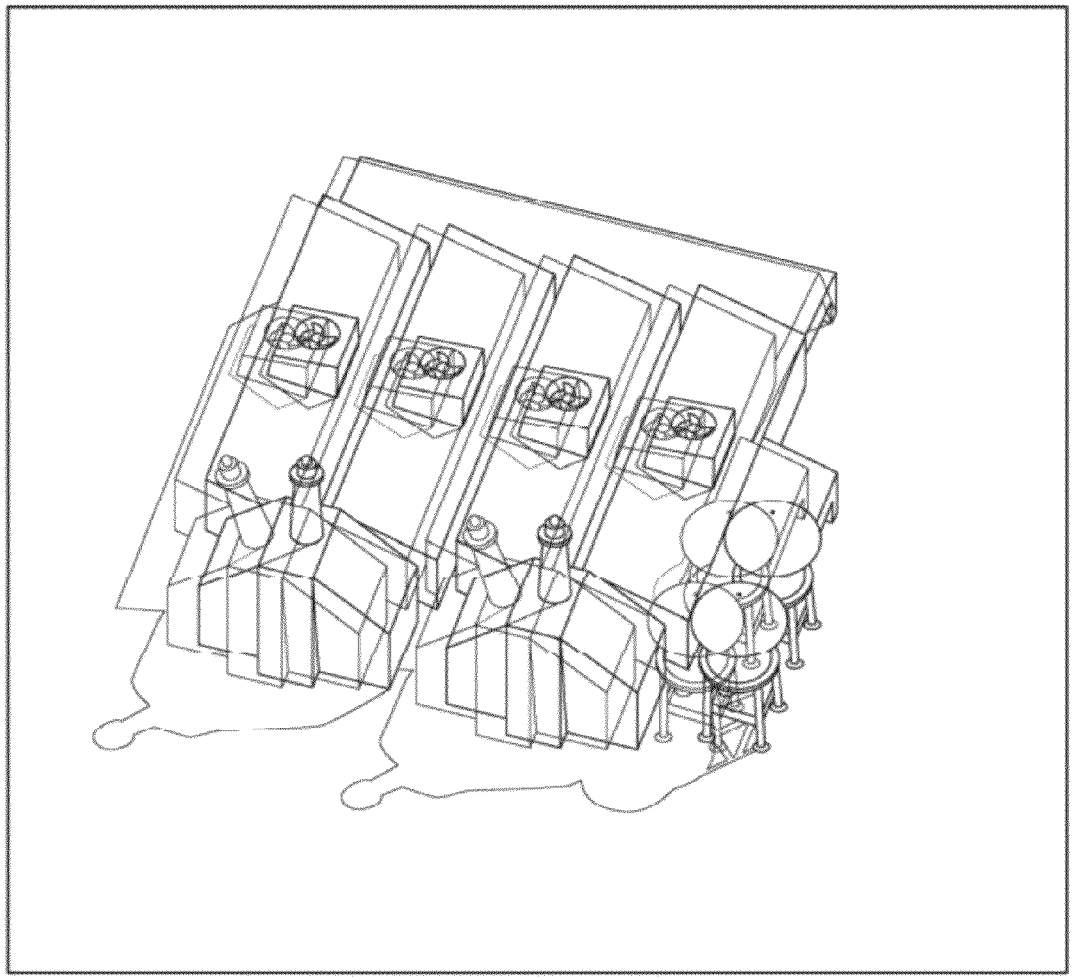
FIG. 17A shows a "red-blue" anaglyph of an exemplary factory building, produced in accordance with an embodiment.

FIG. 17A shows a "red-blue" anaglyph of an exemplary factory building, which is 30-deg off-nadir and side-looking, i.e., 90-deg in azimuth from the direction of platform velocity. Since the drawing is black and white, actual color is not shown in the figures. The left and right image frames were generated at angular separation of approximately 5 degrees.

In actuality, to appreciate fully and view stereoscopic images in 3-D, a pair of 3-D glasses would be worn by the viewer. Each of the images is separately encoded for each of viewing by one of the right and left eye by color. For example, conventional red-blue 3-D glasses may be worn by the viewer to decode the respectively images, one for each eye.

Figure 17B:
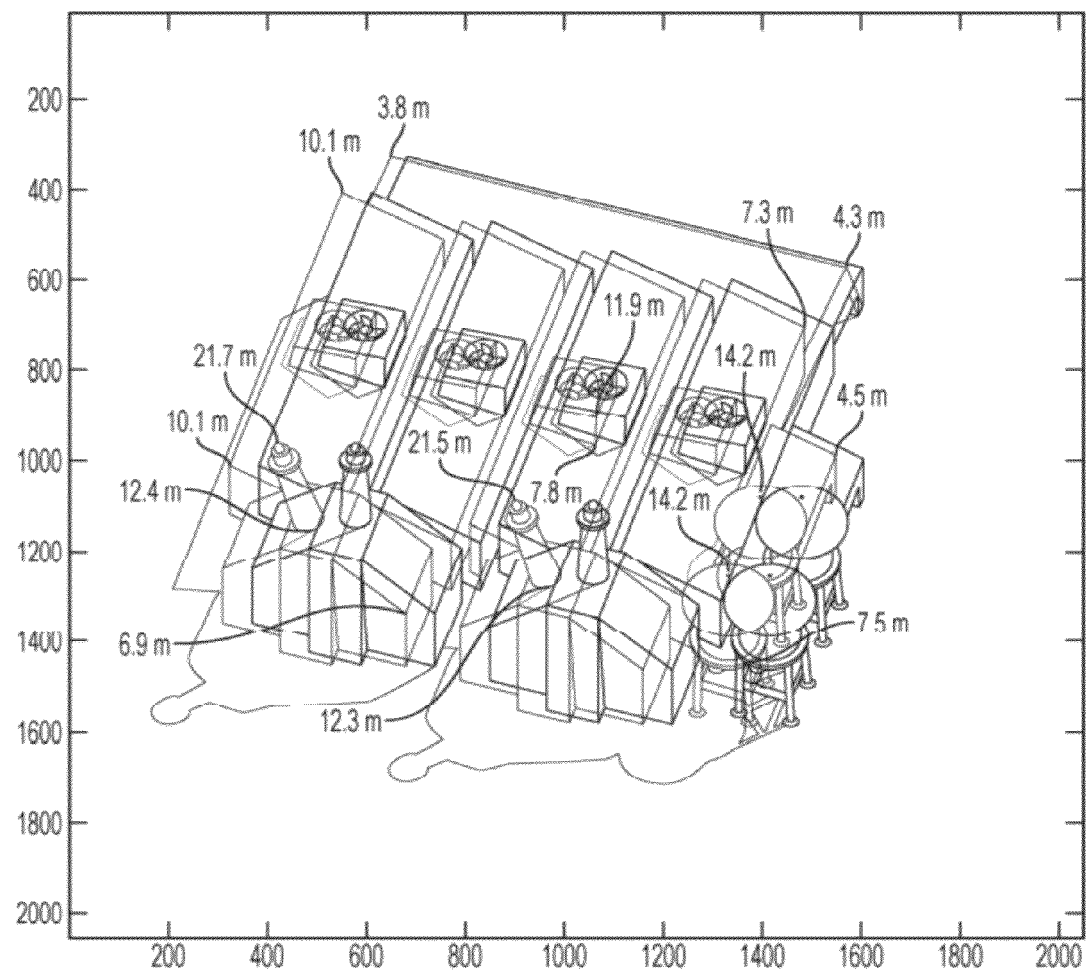
FIG. 17B shows the same anaglyph of the factory shown in FIG. 17A including height estimation annotations for object features depicted therein, produced in accordance with an embodiment.

FIG. 17B shows the same anaglyph of the factory shown in FIG. 17A including height estimation annotations for object features depicted therein, produced in accordance with an embodiment. The height annotations (shown) are estimated heights above ground level based on differential parallax, known altitude and platform motion. Height estimate errors are less than one sensor GSD (when a sufficient number of frames, e.g., 30, are collected).

The modeled height of the tallest object feature depicted in the image frame, i.e., smoke stacks, is about 22.0 m. Other features are of proportional height thereto. Using the height estimated feature, the height of the smoke stacks was estimated to be 21.7 m. Overall, height estimate errors were found to be very low, e.g., ±1-2%.

Figure 18:
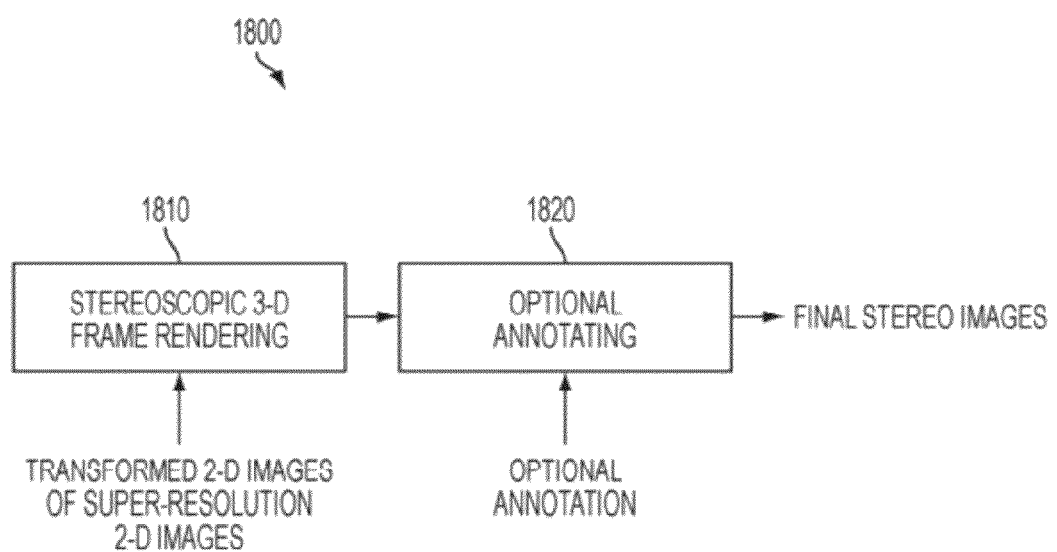
FIG. 18 shows an exemplary schematic for processing performed by a frame selector module, in accordance with an embodiment.

FIG. 18 shows an exemplary schematic for processing 1800 performed by frame selector module 840 (FIG. 8), in accordance with an embodiment. Frame selector module 840, can receive 2-D images or super-resolution 2-D images, and output stereoscopic images for 3-D image rendering.

Frame selector module processing 1800 may include stereoscopic 3-D frame rendering 1810, and optional annotating 1820.

Stereoscopic 3-D frame rendering 1810 selects pairs of frames for generating 3-D imagery. Enhanced or super-resolution image pairs may be preferred for better resolution, but need not be used.

For example, an image may be generated into a pair of stereoscopic images to produce a 3-D effect when viewed. For example, two images may be generated from the image, each having a vantage point for the right and left eye of the viewer, respectively. The two images may have an angle separation corresponding to the left and right eyes' vantage points to the scene. For instance, the angle separation may be approximately 5 degrees for most persons to produce a 3-D effect. Although, in some implementations, users may specifically adjust the angle separation for themselves.

In some instances, users may be provided with options for making continuous video, including features to select between providing left or right eye stereoscopic image generating. And, user may be provided with features for making progressive video, including features for to provide constant left (or right) images, and update right (or left) images only).

Annotating 1820 may render annotations on image frame. For instance, height measurements for one or more objects may be "overlaid" in the frame. For example, numerical, color-coded, or other displays of object height may be included, if desired. Alternatively or additionally, user-inputted annotation or other indicia may be generated in the frame. Such annotations or indicia may include, for example, names of features, relative distances, other objects, dates/time, etc.

Figure 19A:
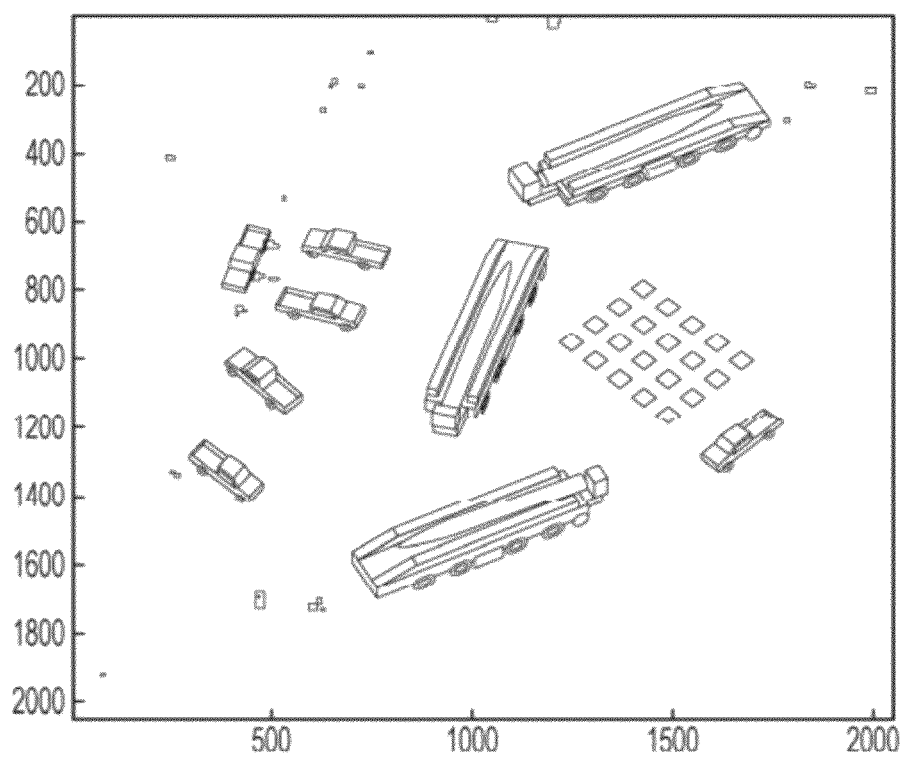
FIG. 19A shows a simulated frame of video data of an exemplary scene at a first instance.

FIG. 19A shows a simulated frame of video data of an exemplary scene at a first instance. The frame was simulated as if rendered by a sensor from an airborne platform. The scene includes a plurality of vehicles, including pick-up trucks and mobile (e.g., SCUD) missile launchers.

Figure 19B:
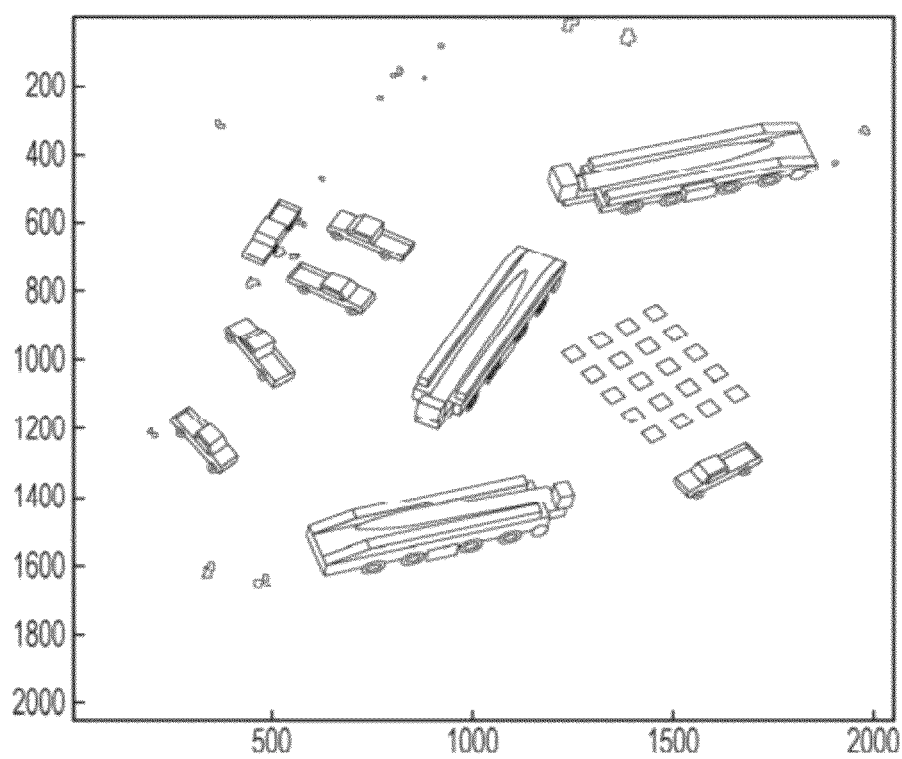
FIG. 19B shows a simulated frame of video data of the same scene shown in FIG. 19A at a second instance.

FIG. 19B shows a simulated frame of video data of the same scene shown in FIG. 19A at a second instance. In this case, the images are taken at approximately 1,000 milliseconds apart, and thus have a different angle separation. The image depicted in this figures has changed slightly with regard to scale, rotations and/or viewing angle for the image depicted in FIG. 19A. Moreover, the image appears slightly more stretched in one dimension (horizontal) than the other.

Figure 19C:
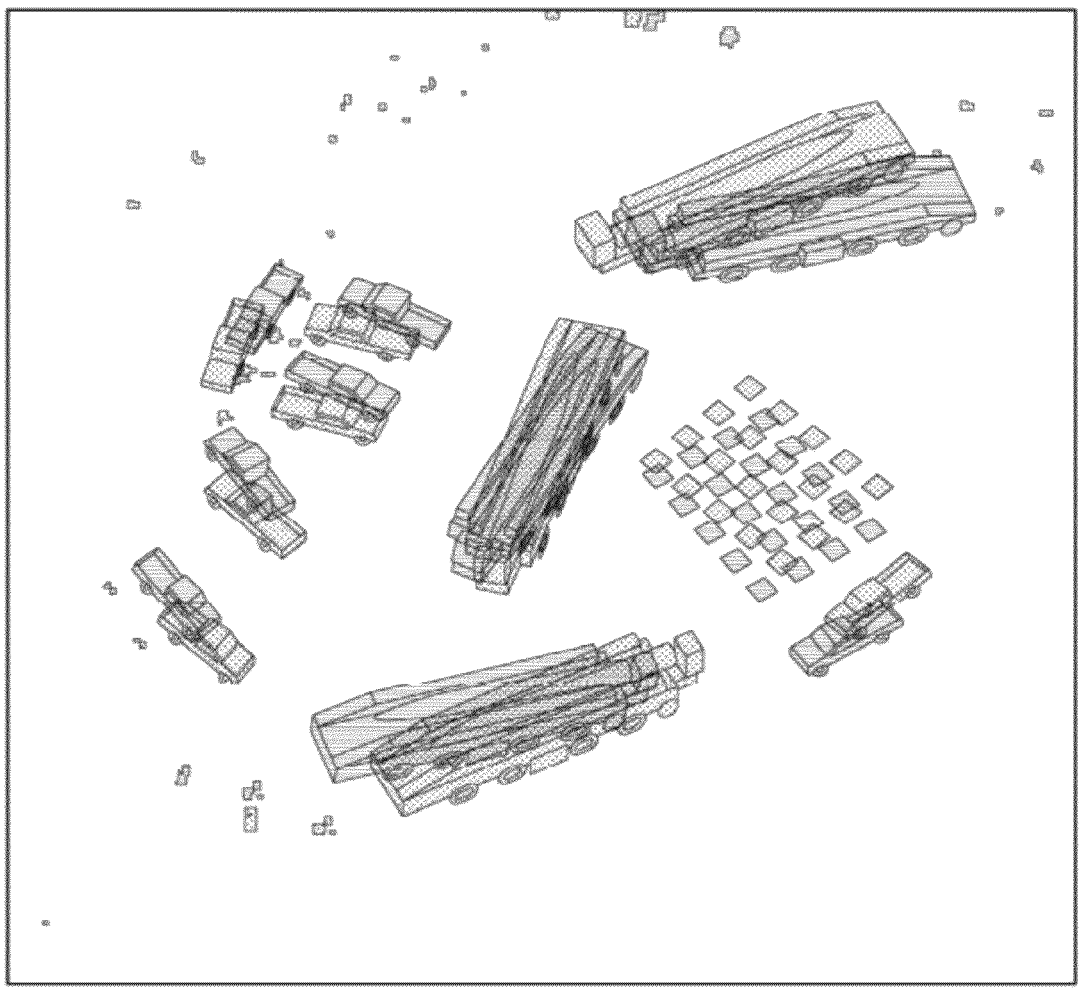
FIG. 19C illustrates an exemplary stereoscopic image schematic produced from the images depicted in FIGS. 19A and 19B generated without the aid of system shown in FIG. 8.

FIG. 19C illustrates an exemplary stereoscopic image schematic produced from the images depicted in FIGS. 19A and 19B generated without conventional techniques without the aid of system 800 (FIG. 8). These pairs of images may be used to provide a 3-D stereoscopic effect when observed by a viewer. Each of the images is slightly different in perspective give the illusion of depth when viewed by a respective eye, and mentally processed by the viewer. For most persons, given the parallel spacing of the eyes, the perspective difference of the right and left eyes is merely slight offset in a horizontal direction only.

In FIG. 19C, "right-eye" image corresponding to the a "red" image shown in FIG. 19A is depicted in a first cross-hatch design, while "left-eye" image corresponding to the "blue" image shown if FIG. 19B is depicted in a second cross-hatch design. In actuality, to appreciate fully and view stereoscopic images in 3-D, a pair of 3-D glasses would be worn by the viewer. Each of the images is separately encoded for each of viewing by one of the right and left eye by color. For example, conventional red-blue 3-D glasses may be worn by the viewer to decode the respectively images, one for each eye.

If the two images depicted in FIGS. 19A and 19B are used as stereoscopic images, the resultant image would appear blurry (and depending on degree of misalignment, perhaps not in 3-D at all) to the viewer because the images are misaligned due to changes in scale, rotation and/or viewing angle for the images beyond that of the perceptive differences between the eyes of viewers.

Figure 19D:
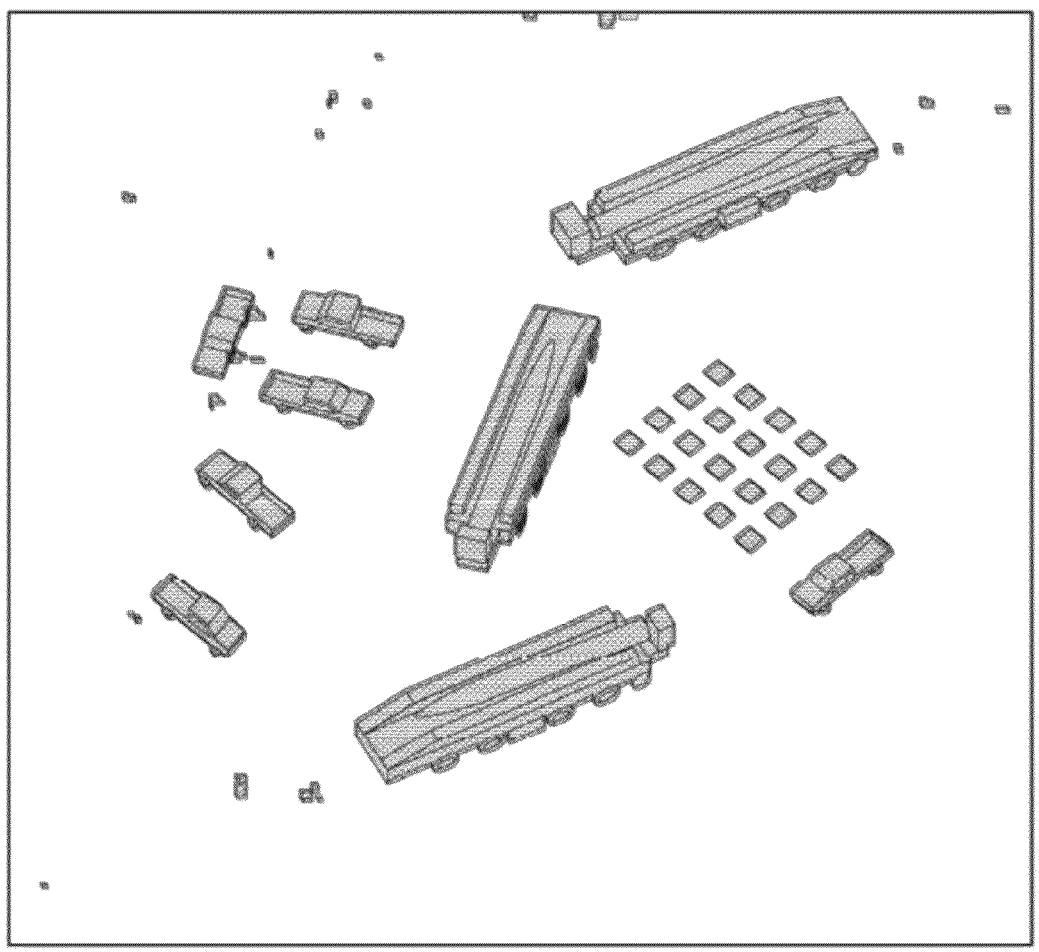
FIG. 19D illustrates an exemplary stereoscopic image schematic produced from the images depicted in FIGS. 19A and 19B having been processed with the aid of system shown in FIG. 8, in accordance with an embodiment.

FIG. 19D illustrates an exemplary stereoscopic image schematic produced from the images depicted in FIGS. 19A and 19B having been processed with the aid of system 800 (FIG. 8) in accordance with an embodiment. These pairs of images may be used to provide a 3-D stereoscopic effect when observed by a viewer. Each of the images is slightly different in perspective give the illusion of depth when viewed by a respective eye, and mentally processed by the viewer.

In FIG. 19D, "right-eye" image corresponding to the image shown in FIG. 19A is depicted in a first cross-hatch design, while "left-eye" image corresponding to the image shown if FIG. 19B is depicted in a second cross-hatch design. As mentioned above, with regard to FIG. 19C, in actuality, to appreciate fully and view stereoscopic images in 3-D, a pair of 3-D glasses would be worn by the viewer.

The images corresponding to FIGS. 19A and 19B have been aligned except for apparent movement in one direction only (e.g., the horizontal direction) to generate a lean. This lean appears in a predictable fashion to the viewer, to give the viewer the perspective of height, in both 2-D and 3-D modes.

While particular embodiments of this disclosure have been described, it is understood that modifications will be apparent to those skilled in the art without departing from the spirit of the inventive concept. The scope of the inventive concept is not limited to the specific embodiments described herein. Other embodiments, uses, and advantages will be apparent to those skilled in art from the specification and the practice of the claimed invention.

What is claimed is:

1. A system configured to capture images, comprising:
   an airborne or space-based movable imaging platform having a single sensor that is configured to capture images of a scene, each image comprising a plurality of pixels; and
   an image processor configured to:
   calculate one or more transformations based on a deterministic path determined from information received regarding movement of the imaging platform, viewing geometry of the single sensor, or both;
   digitally transform captured images with respect to a common field of view (FOV), the one or more transformations compensating for the relative motion between the scene and the imaging platform such that the transformed images appear to be taken by a non-moving imaging platform, in which the pixel size and orientation of pixels are the same, and any motion remaining being residual motion; and
   from the residual motion, identify and track apparent motion of one or more features of a stationary target in the scene, each of which moves, apparently, along a calculated deterministic path as a function of the imaging platform's motion and location of the stationary target with respect to center of the field of view of the imaging platform.

2. The system according to claim 1, wherein, in tracking the one or more features, the image processor is configured to perform one or more of: edge detection, texture detection, shape filtering, corner detection, local maxima detection, or frame difference detection.

3. The system according to claim 1, wherein the image processor is configured to receive information regarding the deterministic path from another source.

4. The system according to claim 1, wherein the image transformations are determined based on a relative motion of the imaging platform, a viewing geometry of the sensor with respect to the imaging platform, or both.

5. The system according to claim 1, wherein the transformations comprise eigenfunctions based on the known trajectory of the movable imaging platform relative to the scene being imaged.

6. The system according to claim 1, wherein the transformations include one or more of: rotation, zoom, skew, parallax, or translation, when necessary.

7. The system according to claim 1, wherein the image processor is further configured to provide resolution enhancement of images.

8. The system according to claim 7, wherein, in performing the resolution enhancement, the image processor is configured to perform a super-resolution image enhancement process of images.

9. The system according to claim 1, wherein the image processor is configured to output a pair of stereoscopic images from one or more transformed images, and wherein the pair of stereoscopic images include two transformed images having a separation selected by the image processor.

10. The system according to claim 1, wherein the image processor is further configured to determine, from the transformed images, a height, an elevation, or three-dimensional information associated with the motion and/or lean of the tracked features of the stationary target.

11. The system according to claim 10, wherein the image processor is configured to output stereoscopic images when a determined height of the feature exceeds a predetermined height.

12. The system according to claim 11, wherein the image processor is further configured to annotate, encode information in, or both, in image frames based on the determined height, elevation, or 3-D information associated with the determined feature of the tracked target.

13. The system according to claim 1, wherein the image processor is configured to receive feedback from one or more user terminals to correct image misalignment.

14. A method for capturing images, the method comprising: capturing images of a scene with a sensor on an airborne or space-based moving imaging platform having a single sensor, each image comprising a plurality of pixels;
   calculating one or more transformations based on a deterministic path determined from information received regarding movement of the imaging platform, viewing geometry of the single sensor, or both;
   digitally transforming captured images with respect to a common field of view (FOV), the one or more transformations compensating for the relative motion between the scene and the imaging platform such that the transformed images appear to be taken by a non-moving imaging platform, in which the pixel size and orientation of pixels are the same, and any motion remaining being residual motion; and
   from the residual motion, identifying and tracking apparent motion of one or more features of a stationary target in the scene, each of which moves, apparently, along a calculated deterministic path as a function of the imaging platform's motion and location of the stationary target with respect to center of the field of view of the imaging platform.

15. The method according to claim 14, wherein said tracking the one or more features comprises performing one or more of: edge detection, texture detection, shape filtering, corner detection, local maxima detection, or frame difference detection.

16. The method according to claim 14, further comprising: receiving information regarding the deterministic path from another source.

17. The method according to claim 14, wherein said image transformations are determined based on a relative motion of the imaging platform and a viewing geometry of the sensor with respect to the imaging platform.

18. The method according to claim 14, wherein the transformations comprise eigenfunctions based on the known trajectory of the movable imaging platform relative to the scene being imaged.

19. The method according to claim 14, wherein the transformations include one or more of: rotation, zoom, skew, parallax, or translation, when necessary.

20. The method according to claim 14, further comprising: performing resolution enhancement of images.

21. The method according to claim 20, wherein the resolution enhancement comprises: performing a super-resolution image enhancement process of images.

22. The method according to claim 14, further comprising:
outputting a pair of stereoscopic images from one or more transformed images; and
selecting transformed images having a separation to be used as the pair of stereoscopic images.

23. The method according to claim 14, further comprising:
determining, from the transformed images, a height, an elevation, or 3-D information associated with the motion and/or lean of the tracked features of the stationary object.

24. The method according to claim 23, further comprising: outputting stereoscopic images when a determined height of the feature exceeds a predetermined height.

25. The method according to claim 23, further comprising: annotating, encoding information in, or both, in image frames based on the determined height, elevation, or 3-D information associated with the determined feature of the tracked target.

26. The method according to claim 14, further comprising: receiving feedback from one or more user terminals, and correcting image misalignment based on said feedback.

27. The system according to claim 1, wherein the transformations comprise homography functions based on the known trajectory of the movable imaging platform relative to the scene being imaged.

28. The method according to claim 14, wherein the transformations comprise homography functions based on the known trajectory of the movable imaging platform relative to the scene being imaged.

\* \* \* \* \*